United States Patent
Kano

(10) Patent No.: US 11,498,484 B2
(45) Date of Patent: Nov. 15, 2022

(54) OVERHEAD IMAGE GENERATION DEVICE, OVERHEAD IMAGE GENERATION METHOD, AND PROGRAM

(71) Applicant: JVCKENWOOD Corporation, Yokohama (JP)

(72) Inventor: Kenichi Kano, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 0 days.

(21) Appl. No.: 17/159,188

(22) Filed: Jan. 27, 2021

(65) Prior Publication Data

US 2021/0146837 A1    May 20, 2021

Related U.S. Application Data

(63) Continuation of application No. PCT/JP2019/028285, filed on Jul. 18, 2019.

(30) Foreign Application Priority Data

Jul. 30, 2018 (JP) .............................. JP2018-142139

(51) Int. Cl.
*G09G 5/00* (2006.01)
*B60R 1/00* (2022.01)
(Continued)

(52) U.S. Cl.
CPC ............... *B60R 1/00* (2013.01); *G06T 11/00* (2013.01); *G08G 1/16* (2013.01); *B60R 2300/303* (2013.01); *B60R 2300/607* (2013.01)

(58) Field of Classification Search
CPC ....... G06T 19/00; G06T 19/006; G06T 17/00; H04N 5/272; A63F 13/10
(Continued)

(56) References Cited

U.S. PATENT DOCUMENTS

2012/0327239 A1   12/2012   Inoue et al.
2013/0027196 A1*   1/2013   Yankun ................. G06V 20/58
                                                                    382/103
(Continued)

FOREIGN PATENT DOCUMENTS

JP     2012-105158     5/2012
JP     2016-046561     4/2016
(Continued)

OTHER PUBLICATIONS

International Search Report and Written Opinion for International Application No. PCT/JP2019/028285 dated Oct. 1, 2019, 7 pages.
(Continued)

*Primary Examiner* — Gordon G Liu
(74) *Attorney, Agent, or Firm* — Amin, Turocy & Watson, LLP

(57) ABSTRACT

An overhead image generation device includes: an image acquisition unit that acquires a peripheral image by capturing an image of a periphery of a vehicle; an approach information acquisition unit that acquires approach information indicating an approach state of an obstacle detected in the periphery of the vehicle to the vehicle; an overhead image generation unit that generates an overhead image A from the peripheral image by performing viewpoint conversion processing so as to look down on the vehicle from above in a vertical direction; an approach state image generation unit that generates an approach state image B showing an approach state of the obstacle to the vehicle for each position of the vehicle in the vertical direction, based on the approach information; and a display control unit that superimposes the overhead image A and the approach state image B and causes a display unit to display the superimposed image.

15 Claims, 11 Drawing Sheets

(51) Int. Cl.
*G06T 11/00* (2006.01)
*G08G 1/16* (2006.01)

(58) Field of Classification Search
USPC .......................................... 345/632
See application file for complete search history.

(56) References Cited

U.S. PATENT DOCUMENTS

| | | |
|---|---|---|
| 2018/0186287 A1 | 7/2018 | Hatakeyama et al. |
| 2020/0086793 A1* | 3/2020 | Watanabe ................. G06T 1/00 |

FOREIGN PATENT DOCUMENTS

| | | |
|---|---|---|
| JP | 2016-119526 | 6/2016 |
| JP | 2018-050277 | 3/2018 |
| JP | 2018-109875 | 7/2018 |
| WO | 2011/145141 | 11/2011 |
| WO | 2018/055873 | 3/2018 |

OTHER PUBLICATIONS

Extended European Search Report for European Patent Application No. 19844974.6 dated Jun. 11, 2021.

* cited by examiner

OVERHEAD IMAGE GENERATION DEVICE, OVERHEAD IMAGE GENERATION METHOD, AND PROGRAM

CROSS-REFERENCE TO RELATED APPLICATION(S)

This application is a Continuation of PCT international application Ser. No. PCT/JP2019/028285 filed on Jul. 18, 2019 which designates the United States, incorporated herein by reference, and which claims the benefit of priority from Japanese Patent Application No. 2018-142139, filed on Jul. 30, 2018, incorporated herein by reference.

BACKGROUND

1. Technical Field

The present disclosure relates to an overhead image generation device, an overhead image generation method, and a program.

2. Description of the Related Art

There is a display device that displays an overhead image of a vehicle in order to cause a driver to recognize information on an obstacle around the vehicle. For example, JP 2018-50277 A discloses that information on a distance from a vehicle to an obstacle is displayed on an overhead image.

According to JP 2018-50277 A, it is possible to recognize which position around the vehicle the obstacle is approaching, but there is room for improvement in order to cause a driver to recognize which position of the vehicle the obstacle is approaching, in more detail.

SUMMARY

It is an object of the present disclosure to at least partially solve the problems in the conventional technology.

An overhead image generation device according to an aspect of the present embodiment comprising: an image acquisition unit that acquires a peripheral image by capturing an image of a periphery of a vehicle; an approach information acquisition unit that acquires approach information indicating an approach state of an obstacle detected in the periphery of the vehicle to the vehicle; an overhead image generation unit that generates an overhead image from the peripheral image by performing viewpoint conversion processing so as to look down on the vehicle from above in a vertical direction; an approach state image generation unit that generates an approach state image showing an approach state of the obstacle to the vehicle for each position of the vehicle in the vertical direction, based on the approach information; and a display control unit that superimposes the overhead image and the approach state image and causes a display unit to display a superimposed image.

An overhead image generation method according to an aspect of the present embodiment comprising: an image acquiring step of acquiring a peripheral image by capturing an image of a periphery of a vehicle; an approach information acquiring step of acquiring approach information indicating an approach state of an obstacle detected in the periphery of the vehicle to the vehicle; an overhead image generating step of generating an overhead image from the peripheral image by performing viewpoint conversion processing so as to look down on the vehicle from above in a vertical direction; an approach state image generating unit step of generating an approach state image showing an approach state of the obstacle to the vehicle for each position of the vehicle in the vertical direction, based on the approach information; and a display controlling step of superimposing the overhead image and the approach state image and causing a display unit to display a superimposed image.

A non-transitory computer readable recording medium storing therein a program according to an aspect of the present embodiment for causing a computer to execute the following steps: an image acquiring step of acquiring a peripheral image by capturing an image of a periphery of a vehicle; an approach information acquiring step of acquiring approach information indicating an approach state of an obstacle detected in the periphery of the vehicle to the vehicle; an overhead image generating step of generating an overhead image from the peripheral image by performing viewpoint conversion processing so as to look down on the vehicle from above in a vertical direction; an approach state image generating unit step of generating an approach state image showing an approach state of the obstacle to the vehicle for each position of the vehicle in the vertical direction, based on the approach information; and a display controlling step of superimposing the overhead image and the approach state image and causing a display unit to display a superimposed image.

DETAILED DESCRIPTION OF THE PREFERRED EMBODIMENTS

Hereinafter, the present embodiment will be described in detail with reference to the drawings. Note that the present disclosure is not limited to embodiments to be described below.

First Embodiment (Configuration of Overhead Image Generation System)

Figure 1:
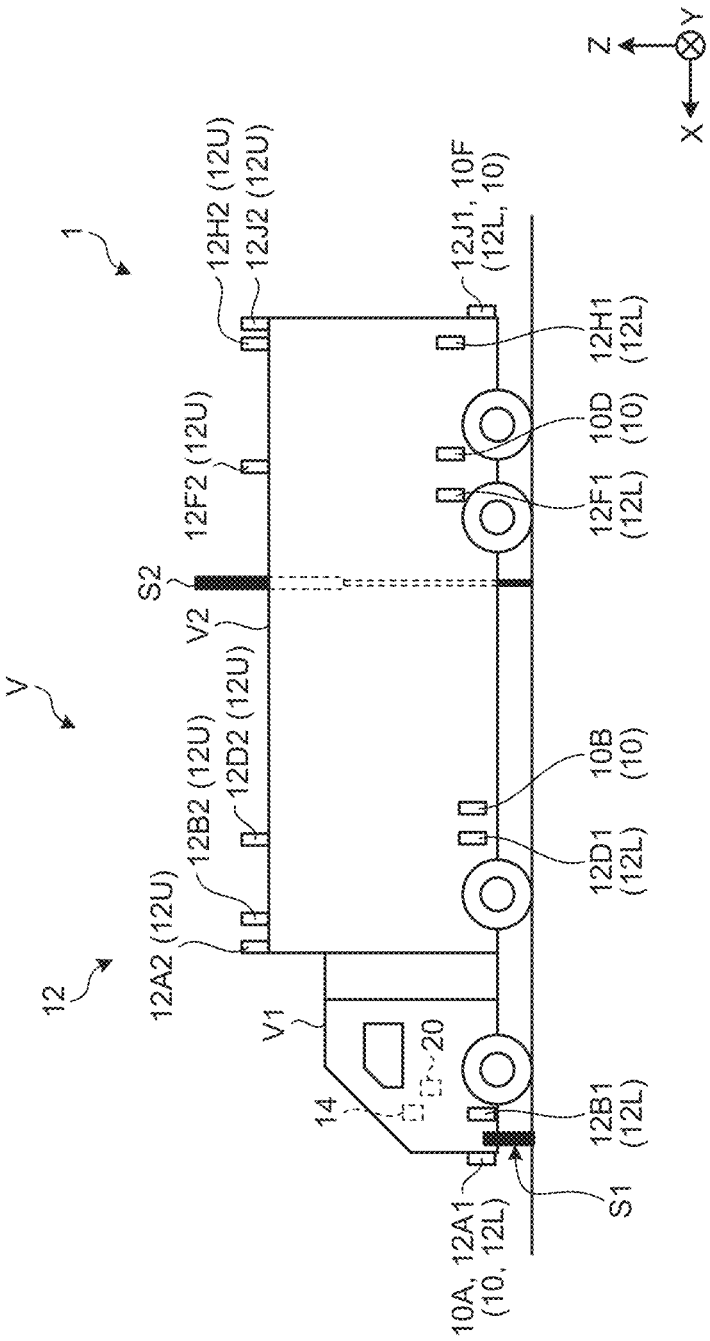
FIG. 1 is a schematic view illustrating a vehicle according to a first embodiment.
Figure 2:
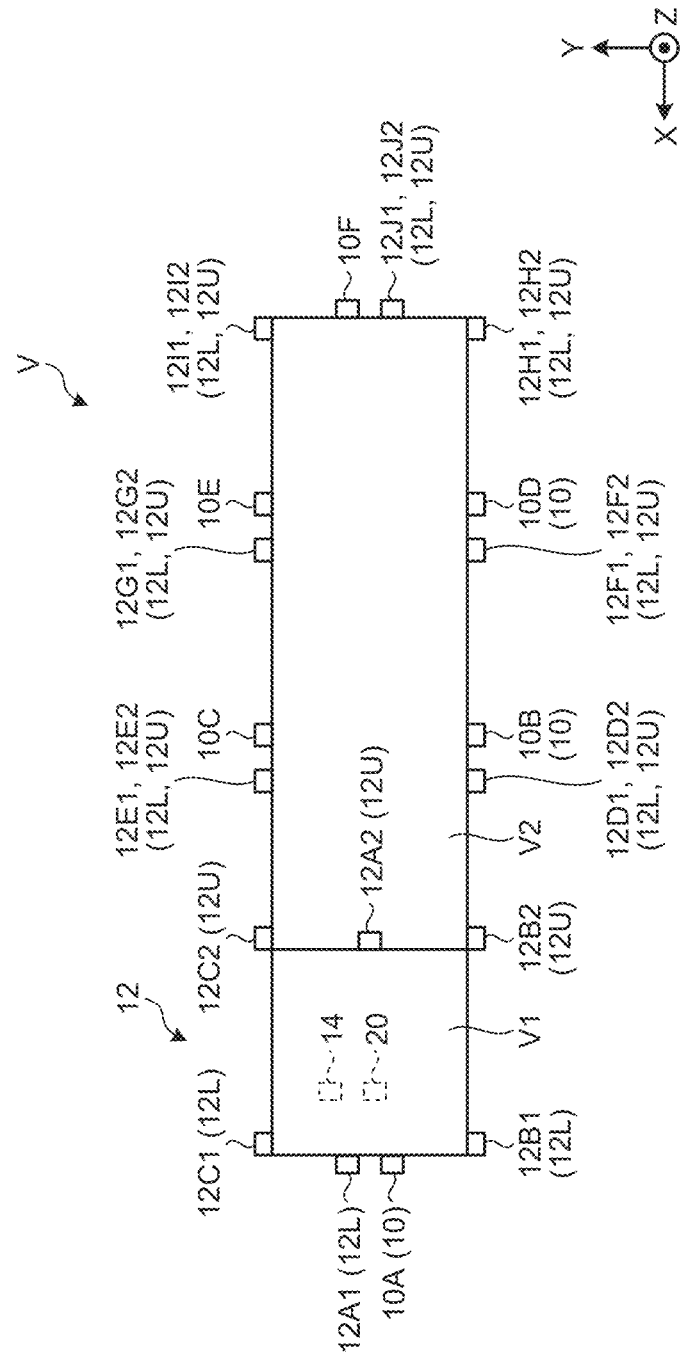
FIG. 2 is a schematic view illustrating the vehicle according to the first embodiment.

FIGS. 1 and 2 are schematic views illustrating a vehicle according to a first embodiment. FIG. 1 is a front view of a vehicle V, and FIG. 2 is a top view of the vehicle V. As illustrated in FIG. 1, the vehicle V is mounted with an overhead image generation system 1 according to the first embodiment. As described in detail later, the overhead image generation system 1 generates a display image P (see FIG. 4) indicating a situation of the periphery of the vehicle V. The overhead image generation system 1 may be a device that can be used in the vehicle in a portable type, in addition to being placed on the vehicle V. That is, the overhead image generation system 1 may be detachable from the vehicle V. In the present embodiment, the vehicle V is a large vehicle such as a truck or the like, and has a vehicle portion V1 on which a driver gets and a container portion V2 provided behind the vehicle portion V1 (on a side opposite to an X direction to be described later). However, the vehicle V is not limited to such a large vehicle, and may be any type of vehicle. Hereinafter, a forward movement direction of the vehicle V is defined as an X direction, an upward direction (a direction away from the earth's surface) in a vertical direction is defined as a Z direction, and a direction orthogonal to the X direction and the Z direction is defined as a Y direction. Hereinafter, appropriately, the X direction side will be described as a front side, a side opposite to the X direction will be described as a rear side, the Y direction will be described as a right side, a side opposite to the Y direction will be described as a left side, the Z-direction will be described as an upper side (upper side in a vertical direction), and a side opposite to the Z direction will be described as a lower side (lower side in a vertical direction).

As illustrated in FIGS. 1 and 2, the overhead image generation system 1 includes an image capturing unit 10, an obstacle detection unit 12, a display unit 14, and an overhead image generation device 20. The image capturing unit 10 is an image capturing device that captures an image of the periphery of the vehicle V, that is, a camera. The image capturing unit 10 sequentially captures images of the periphery of the vehicle V every predetermined frame to capture a moving image of the periphery of the vehicle V. As illustrated in FIG. 2, in the present embodiment, the image capturing unit 10 includes image capturing units 10A, 10B, 10C, 10D, 10E, and 10F.

As illustrated in FIG. 2, the image capturing unit 10A is arranged at a place of a front side of the vehicle V. The image capturing unit 10A captures an image of the periphery centered on the front side of the vehicle V. The image capturing unit 10B is arranged at a place of a left front side of the vehicle V. The image capturing unit 10B captures an image of the periphery centered on the left front of the vehicle V. The image capturing unit 10C is arranged at a place of a right front side of the vehicle V. The image capturing unit 10C captures an image of the periphery centered on the right front of the vehicle V. The image capturing unit 10D is arranged at a place of a left rear side of the vehicle V. The image capturing unit 10D captures an image of the periphery centered on the left rear of the vehicle V. The image capturing unit 10E is arranged at a place of a right rear side of the vehicle V. The image capturing unit 10E captures an image of the periphery centered on the right rear of the vehicle V. The image capturing unit 10F is arranged at a place of a rear side of the vehicle V. The image capturing unit 10F captures an image of the periphery centered on the rear of the vehicle V. The image capturing units 10A, 10B, 10C, 10D, 10E, and 10F output the captured images (moving image) to the overhead image generation device 20.

The image capturing unit 10 captures images of all directions of the vehicle V by the image capturing units 10A, 10B, 10C, 10D, 10E, and 10F. However, as long as the image capturing unit 10 captures the image of the periphery of the vehicle V, the number and installation positions of image capturing units included in the image capturing unit 10 are arbitrary.

As illustrated in FIG. 2, the obstacle detection unit 12 is a device that detects whether or not there is an obstacle in the vicinity of the vehicle V. In other words, the obstacle detection unit 12 is a device that detects whether or not an obstacle is approaching the vehicle V, and sequentially detects whether or not the obstacle is approaching the vehicle V every predetermined period. That is, the obstacle detection unit 12 detects an obstacle that is within a predetermined distance from the vehicle V as the obstacle approaching the vehicle V, and detects whether or not there is an obstacle that is approaching the vehicle V enough to be in contact with the vehicle V. In the present embodiment, the obstacle detection unit 12 is a sensor that outputs a radio wave other than visible light toward the periphery of the vehicle V and detects the obstacle by a reflected wave of the radio wave. The obstacle detection unit 12 is, for example, an infrared sensor, an ultrasonic sensor, a millimeter wave radar, or the like, and may be configured by a combination thereof. However, the obstacle detection unit 12 may be any device as long as it can detect whether or not there is an obstacle in the vicinity of the vehicle V. For example, the image capturing unit 10 may also function as the obstacle detection unit 12. In this case, the image capturing unit 10 as the obstacle detection unit 12 may detect that there is an obstacle in a case where the obstacle appears in the captured image. In addition, the overhead image generation device 20 may calculate a distance between the obstacle appearing in the image and the vehicle V based on the image captured by the image capturing unit 10 and detect that there is an obstacle in a case where there is an obstacle within a predetermined distance, and the image capturing unit 10 itself may detect that there is an obstacle by calculating a distance between the obstacle and the vehicle V.

In the first embodiment, the obstacle detection unit 12 detects each of an obstacle that is approaching a place of an upper side of the vehicle V and an obstacle that is approaching a place of a lower side of the vehicle V. That is, as illustrated in FIGS. 1 and 2, the obstacle detection unit 12 includes a lower side obstacle detection unit 12L and an upper side obstacle detection unit 12U, in which the lower side obstacle detection unit 12L detects whether or not there is an obstacle approaching a part of the lower side of the vehicle V, and the upper side obstacle detection unit 12U detects whether or not there is an obstacle approaching a part of the upper side of the vehicle V. Note that in an example of FIGS. 1 and 2, obstacle detection units 12A1, 12B1, 12C1, 12D1, 12E1, 12F1, 12G1, 12H1, 12I1, and 12J1 correspond to the lower side obstacle detection unit 12L, and obstacle detection units 12A2, 12B2, 12C2, 12D2, 12E2, 12F2, 12G2, 12H2, 12I2, and 12J2 correspond to the upper side obstacle detection unit 12U.

The upper side obstacle detection unit 12U is provided on an upper side of the vehicle V as compared with the lower side obstacle detection unit 12L. That is, a position (part) of the vehicle V which becomes a reference for the upper side obstacle detection unit 12U to detect the obstacle is on a Z direction side as compared with a position (part) of the vehicle V which becomes a reference for the lower side obstacle detection unit 12L to detect the obstacle. In other words, it can be said that the upper side obstacle detection unit 12U detects whether or not there is an obstacle within a predetermined distance range with respect to the part of the upper side of the vehicle V and the lower side obstacle detection unit 12L detects whether or not there is an obstacle within a predetermined distance range with respect to the part of the lower side of the vehicle V as compared with the upper side obstacle detection unit 12U. Note that the part (place) of the lower side of the vehicle V here refers to, for example, a part between an end portion of the vehicle V in an opposite direction to the Z direction, that is, a bottom portion of the vehicle V to a central position of the vehicle V in the vertical direction. In addition, the part (place) of the upper side of the vehicle V refers to, for example, a part between the central position of the vehicle V in the vertical direction and an end portion of the vehicle V in the Z direction side, that is, an upper surface portion of the vehicle V. However, the part of the upper side of the vehicle V is only required to be on the Z direction side as compared with the part of the lower side of the vehicle V, and positions of the part of the upper side and the part of the lower side of the vehicle V in the vertical direction of the vehicle V may be arbitrary.

Hereinafter, installation positions of the respective obstacle detection units 12 will be described. The obstacle detection unit 12A1 is arranged at a place of the front side and the lower side of the vehicle V, and detects an obstacle approaching the place of the front side and the lower side of the vehicle V. The obstacle detection unit 12A2 is arranged at a place of the front side and the upper side of the vehicle V, and detects an obstacle approaching the place of the front side and the upper side of the vehicle V. Furthermore, the obstacle detection unit 12A2 is provided above the obstacle detection unit 12A1, and detects an obstacle approaching a position of the upper side of the vehicle V as compared with the obstacle detection unit 12A1.

The obstacle detection unit 12B1 is arranged at a place of a lower side of a corner of the left front side of the vehicle V, and detects an obstacle approaching the place of the lower side of the corner of the left front side of the vehicle V. The obstacle detection unit 12B2 is arranged at a place of an upper side of the corner of the left front side of the vehicle V, and detects an obstacle approaching the place of the upper side of the corner of the left front side of the vehicle V. Furthermore, the obstacle detection unit 12B2 is provided above the obstacle detection unit 12B1, and detects an obstacle approaching a position of the upper side of the vehicle V as compared with the obstacle detection unit 12B1.

The obstacle detection unit 12C1 is arranged at a place of a lower side of a corner of the right front side of the vehicle V, and detects an obstacle approaching the place of the lower side of the corner of the right front side of the vehicle V. The obstacle detection unit 12C2 is arranged at a place of an upper side of a corner of the right front side of the vehicle V, and detects an obstacle approaching the place of the upper side of the corner of the right front side of the vehicle V. Furthermore, the obstacle detection unit 12C2 is provided above the obstacle detection unit 12C1, and detects an obstacle approaching a position of the upper side of the vehicle V as compared with the obstacle detection unit 12C1.

The obstacle detection unit 12D1 is arranged at a place of a lower side of the left front side of the vehicle V, and detects an obstacle approaching the place of the lower side of the left front side of the vehicle V. The obstacle detection unit 12D1 is provided on a rear side of the vehicle V as compared with the obstacle detection unit 12B1, and detects an obstacle approaching a position of the rear side of the vehicle V as compared with the obstacle detection unit 12B1. The obstacle detection unit 12D2 is arranged at a place of an upper side of the left front side of the vehicle V, and detects an obstacle approaching the place of the upper side of the left front side of the vehicle V. The obstacle detection unit 12D2 is provided on a rear side of the vehicle V as compared with the obstacle detection unit 12B2, and detects an obstacle approaching a position of the rear side of the vehicle V as compared with the obstacle detection unit 12B2. Furthermore, the obstacle detection unit 12D2 is provided above the obstacle detection unit 12D1, and detects an obstacle approaching a position of the upper side of the vehicle V as compared with the obstacle detection unit 12D1.

The obstacle detection unit 12E1 is arranged at a place of a lower side of the right front side of the vehicle V, and detects an obstacle approaching the place of the lower side of the right front side of the vehicle V. The obstacle detection unit 12E1 is provided on a rear side of the vehicle V as compared with the obstacle detection unit 12C1, and detects an obstacle approaching a position of the rear side of the vehicle V as compared with the obstacle detection unit 12C1. The obstacle detection unit 12E2 is arranged at a place of an upper side of the right front side of the vehicle V, and detects an obstacle approaching the place of the upper side of the right front side of the vehicle V. The obstacle detection unit 12E2 is provided on a rear side of the vehicle V as compared with the obstacle detection unit 12C2, and detects an obstacle approaching a position of the rear side of the vehicle V as compared with the obstacle detection unit 12C2. Furthermore, the obstacle detection unit 12E2 is provided above the obstacle detection unit 12E1, and detects an obstacle approaching a position of the upper side of the vehicle V as compared with the obstacle detection unit 12E1.

The obstacle detection unit 12F1 is arranged at a place of a lower side of the left rear side of the vehicle V, and detects an obstacle approaching the place of the lower side of the left rear side of the vehicle V. The obstacle detection unit 12F1 is provided on a rear side of the vehicle V as compared with the obstacle detection unit 12D1, and detects an obstacle approaching a position of the rear side of the vehicle V as compared with the obstacle detection unit 12D1. The obstacle detection unit 12F2 is arranged at a place of an upper side of the left rear side of the vehicle V, and detects an obstacle approaching the place of the upper side of the left rear side of the vehicle V. The obstacle detection unit 12F2 is provided on a rear side of the vehicle V as compared with the obstacle detection unit 12D2, and detects an obstacle approaching a position of the rear side of the vehicle V as compared with the obstacle detection unit 12D2. Furthermore, the obstacle detection unit 12F2 is provided above the obstacle detection unit 12F1, and detects an obstacle approaching a position of the upper side of the vehicle V as compared with the obstacle detection unit 12F1.

The obstacle detection unit 12G1 is arranged at a place of a lower side of the right rear side of the vehicle V, and detects an obstacle approaching the place of the lower side of the right rear side of the vehicle V. The obstacle detection unit 12G1 is provided on a rear side of the vehicle V as compared with the obstacle detection unit 12E1, and detects an obstacle approaching a position of the rear side of the vehicle V as compared with the obstacle detection unit 12E1. The obstacle detection unit 12G2 is arranged at a place of an upper side of the right rear side of the vehicle V, and detects an obstacle approaching the place of the upper side of the right rear side of the vehicle V. The obstacle detection unit 12G2 is provided on a rear side of the vehicle V as compared with the obstacle detection unit 12E2, and detects an obstacle approaching a position of the rear side of the vehicle V as compared with the obstacle detection unit 12E2.

Furthermore, the obstacle detection unit 12G2 is provided above the obstacle detection unit 12G1, and detects an obstacle approaching a position of the upper side of the vehicle V as compared with the obstacle detection unit 12G1.

The obstacle detection unit 12H1 is arranged at a place of a lower side of a corner of the left rear side of the vehicle V, and detects an obstacle approaching the place of the lower side of the corner of the left rear side of the vehicle V. The obstacle detection unit 12H1 is provided on a rear side of the vehicle V as compared with the obstacle detection unit 12F1, and detects an obstacle approaching a position of the rear side of the vehicle V as compared with the obstacle detection unit 12F1. The obstacle detection unit 12H2 is arranged at a place of an upper side of a corner of the left rear side of the vehicle V, and detects an obstacle approaching the place of the upper side of the corner of the left rear side of the vehicle V. The obstacle detection unit 12H2 is provided on a rear side of the vehicle V as compared with the obstacle detection unit 12F2, and detects an obstacle approaching a position of the rear side of the vehicle V as compared with the obstacle detection unit 12F2. Furthermore, the obstacle detection unit 12H2 is provided above the obstacle detection unit 12H1, and detects an obstacle approaching a position of the upper side of the vehicle V as compared with the obstacle detection unit 12H1.

The obstacle detection unit 12I1 is arranged at a place of a lower side of a corner of the right rear side of the vehicle V, and detects an obstacle approaching the place of the lower side of the corner of the right rear side of the vehicle V. The obstacle detection unit 12I1 is provided on a rear side of the vehicle V as compared with the obstacle detection unit 12G1, and detects an obstacle approaching a position of the rear side of the vehicle V as compared with the obstacle detection unit 12G1. The obstacle detection unit 12I2 is arranged at a place of an upper side of a corner of the right rear side of the vehicle V, and detects an obstacle approaching the place of the upper side of the corner of the right rear side of the vehicle V. The obstacle detection unit 12I2 is provided on a rear side of the vehicle V as compared with the obstacle detection unit 12G2, and detects an obstacle approaching a position of the rear side of the vehicle V as compared with the obstacle detection unit 12G2. Furthermore, the obstacle detection unit 12I2 is provided above the obstacle detection unit 12I1, and detects an obstacle approaching a position of the upper side of the vehicle V as compared with the obstacle detection unit 12I1.

The obstacle detection unit 12J1 is arranged at a place of a rear side and a lower side of the vehicle V, and detects an obstacle approaching the place of the rear side and the lower side of the vehicle V. The obstacle detection unit 12J2 is arranged at a place of a rear side and an upper side of the vehicle V, and detects an obstacle approaching the place of the rear side and the upper side of the vehicle V. Furthermore, the obstacle detection unit 12J2 is provided above the obstacle detection unit 12J1, and detects an obstacle approaching a position of the upper side of the vehicle V as compared with the obstacle detection unit 12J1.

As such, the obstacle detection unit 12 detects whether or not there is an obstacle approaching each region (section) around the vehicle V viewed from the direction Z, by including a plurality of obstacle detection units. That is, the obstacle detection unit 12 detects whether there is an obstacle approaching the vehicle V in all directions of the vehicle V. In addition, the obstacle detection unit 12 can detect whether or not there is an obstacle approaching the vehicle V, for each position (each place) of the vehicle V in the Z direction (vertical direction), by including the upper side obstacle detection unit 12U and the lower side obstacle detection unit 12L. That is, it can be said that the obstacle detection unit 12 detects whether or not there is an obstacle approaching the vehicle V for each position around the vehicle V viewed from the direction Z (for each section in a peripheral direction of an outer periphery of the vehicle V with the direction Z as a central axis) and for each position of the vehicle V in the Z direction. Note that the obstacle detection unit 12 is only required to be capable of detecting the obstacle approaching the vehicle V for each position around the vehicle V and for each position of the vehicle V in the Z direction, and the number and installation positions of obstacle detection units are not limited to those in the above description and are arbitrary. For example, in the present embodiment, the obstacle detection unit 12 may detect an obstacle approaching each of the three or more positions in the Z direction by arranging three or more obstacle detection units in the Z direction, for example. That is, the obstacle detection unit 12 is only required to detect whether or not there is an obstacle approaching each of a plurality of positions of the vehicle V in the Z direction (vertical direction).

The obstacle detection unit 12 outputs information on the detected obstacle in the periphery of the vehicle V, that is, information indicating whether or not the obstacle is approaching the vehicle V, to the overhead image generation device 20.

The display unit 14 is provided inside the vehicle V. The display unit 14 is provided at a position where it can be visually recognized by the driver. The display unit 14 is a display that displays an image, and is, for example, a display including a liquid crystal display (LCD) or an organic electro-luminescence (EL) display. The display unit 14 displays a display image P (see FIG. 4) based on an image signal output from the overhead image generation device 20. The display unit 14 may be dedicated to the overhead image generation system 1 or may be used jointly with another system including, for example, a navigation system.

The overhead image generation device 20 is provided inside the vehicle V. The overhead image generation device 20 generates a display image P based on the image captured by the image capturing unit 10 and the information on the obstacle detected by the obstacle detection unit 12, and causes the display unit 14 to display the generated display image P. Hereinafter, the overhead image generation device 20 will be described in detail.

Figure 3:
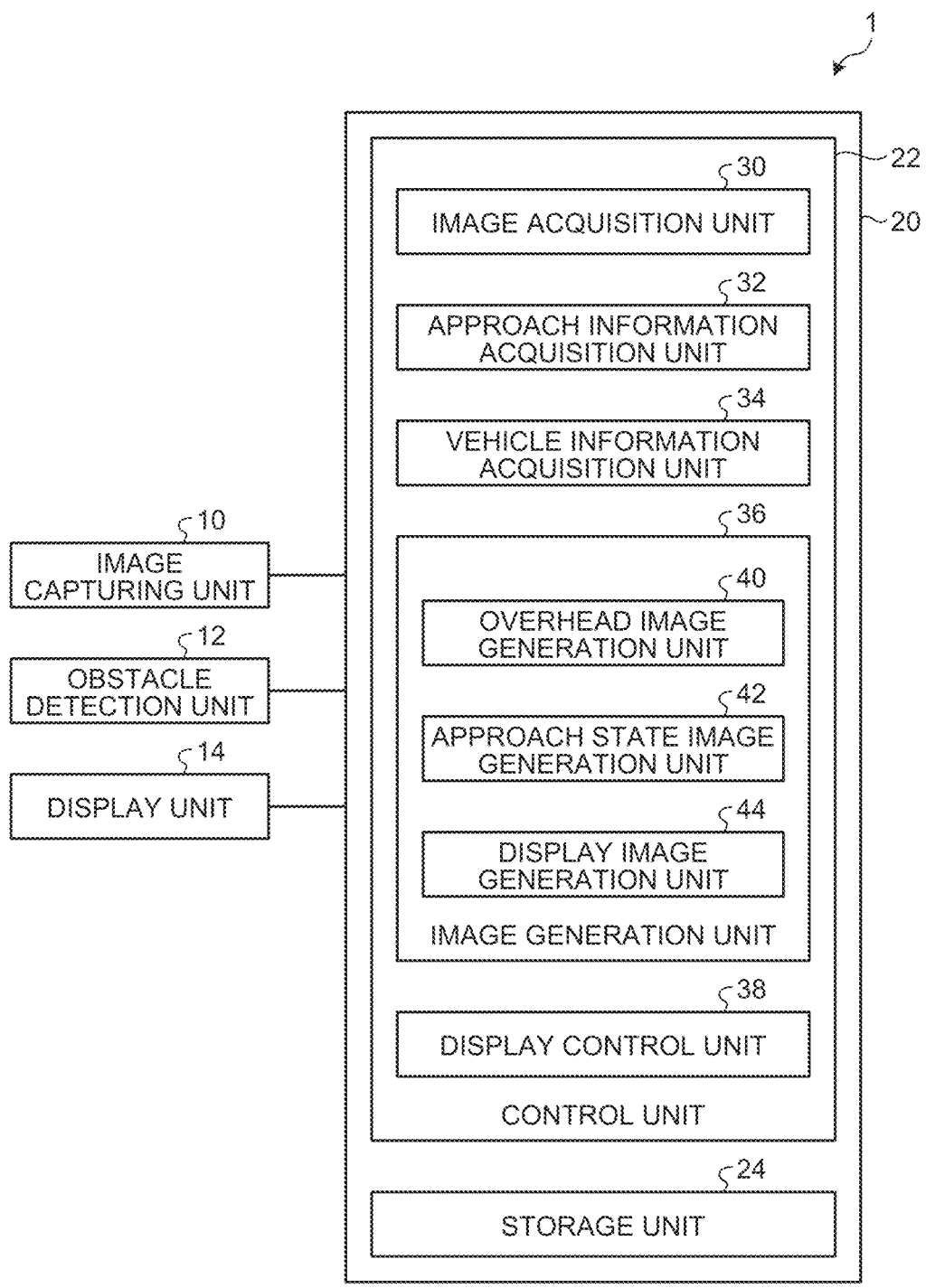
FIG. 3 is a schematic block diagram of an overhead image generation system according to the first embodiment.

FIG. 3 is a schematic block diagram of the overhead image generation system according to the first embodiment. As illustrated in FIG. 3, the overhead image generation device 20 includes a control unit 22 and a storage unit 24. The control unit 22 is, for example, an arithmetic processing unit composed of a central processing unit (CPU) or the like. The storage unit 24 stores data required for various processing in the overhead image generation device 20 and various processing results. The storage unit 24 is, for example, a semiconductor memory element such as a random access memory (RAM), a read only memory (ROM), or flash memory, or the like, or a storage device such as a hard disk, an optical disk, or the like.

The control unit 22 loads a program stored in the storage unit 24 into a memory and executes an instruction included in the program. As illustrated in FIG. 3, the control unit 22 includes an image acquisition unit 30, an approach information acquisition unit 32, a vehicle information acquisition unit 34, an image generation unit 36, and a display control unit 38.

The image acquisition unit 30 acquires a peripheral image by imaging the periphery of the vehicle V. More specifically, the image acquisition unit 30 acquires the image captured by the image capturing unit 10 as a peripheral image. The image acquisition unit 30 outputs the acquired peripheral image to the image generation unit 36.

The approach information acquisition unit 32 acquires approach information indicating an approach state of the obstacle detected in the periphery of the vehicle V to the vehicle V. More specifically, the approach information acquisition unit 32 acquires approach information of the obstacle to the vehicle V based on information regarding whether or not there is an obstacle in the periphery of the vehicle V, detected by the obstacle detection unit 12. The approach state of the obstacle to the vehicle V refers to a state in which whether or not the obstacle is approaching the vehicle V is indicated for each position of the vehicle V, and the approach information is information indicating which position of the vehicle V the obstacle is approaching. More specifically, the approach information acquisition unit 32 acquires a position that the obstacle is approaching among respective positions of the vehicle V in the direction Z as the approach information, based on the information detected by the obstacle detection unit 12. Then, the approach information acquisition unit 32 acquires a position that the obstacle is approaching among positions around the vehicle V viewed from the direction Z as the approach information, based on the information detected by the obstacle detection unit 12. For example, in a case where the upper side obstacle detection unit 12U has detected that there is an obstacle, the approach information acquisition unit 32 acquires as approach information that the obstacle is approaching the upper side of the vehicle V. In addition, in a case where the lower side obstacle detection unit 12L has detected that there is an obstacle, the approach information acquisition unit 32 acquires as approach information that the obstacle is approaching the lower side of the vehicle V. Furthermore, in a case where, for example, the obstacle detection unit 12A1 has detected that there is an obstacle, the approach information acquisition unit 32 acquires as approach information that the obstacle is approaching the place of the front side and the lower side of the vehicle V.

As such, the approach information acquisition unit 32 acquires the position that the obstacle is approaching, detected by the obstacle detection unit 12, as the approach information. The approach information acquisition unit 32 outputs the acquired approach information to the image generation unit 36. Note that the approach information acquisition unit 32 may acquire a position to which a distance from the obstacle is equal to or shorter than a predetermined threshold distance among positions that the obstacles are approaching, detected by the obstacle detection unit 12, as the approach information. That is, the approach information acquisition unit 32 can set a distance from the obstacle to the vehicle V, which is a criterion for determining whether or not there is an obstacle that is approaching the vehicle, to a closer distance by setting the threshold distance.

The vehicle information acquisition unit 34 acquires vehicle information, which is a trigger for displaying the display image P, such as vehicle gear operation information or the like, from a controller area network (CAN), various sensors that sense a state of the vehicle, or the like. The vehicle information acquisition unit 34 outputs the acquired vehicle information to the image generation unit.

The image generation unit 36 generates the display image P based on the peripheral image acquired by the image acquisition unit 30 and the approach information acquired by the approach information acquisition unit 32. As illustrated in FIG. 3, the image generation unit 36 includes an overhead image generation unit 40, an approach state image generation unit 42, and a display image generation unit 44.

The overhead image generation unit 40 generates an overhead image A from the peripheral image acquired by the image acquisition unit 30 by performing viewpoint conversion processing so as to look down on the vehicle V from above in the vertical direction (Z direction side). More specifically, the overhead image generation unit 40 generates an image including a surrounding overhead image A1 and an own vehicle image AV (own vehicle icon) as the overhead image A. The surrounding overhead image A1 is an image obtained by performing viewpoint conversion processing on the peripheral image so as to look down on the vehicle V from above in the vertical direction (Z direction side). The overhead image generation unit 40 synthesizes the images captured by each of the image capturing units 10A, 10B, 10C, 10D, 10E, and 10F to generate the surrounding overhead image A1. A method of generating the surrounding overhead image A1 may be any known method and is not limited. The own vehicle image AV is an image showing the vehicle V, which will be described in detail later. Note that since the peripheral image is a moving image that is sequentially captured, the overhead image generation unit 40 updates the overhead image A each time the peripheral image is updated.

Note that in a case where the image capturing unit 10 is attachable to or detachable from the vehicle V, it is preferable that the overhead image generation unit 40 detects a position of the image capturing unit 10 each time the image capturing unit 10 is attached to the vehicle V and synthesizes respective images of the image capturing unit 10 based on the position of the image capturing unit 10. If the position of the image capturing unit 10 is known, it is possible to know an image of which position the image capturing unit 10 is capturing, and it is thus possible to appropriately synthesize the respective images to appropriately generate the surrounding overhead image A1. For example, a known method such as a global positioning system (GPS) or the like may be used as the position detection. In addition, for example, a reference position for attaching each image capturing unit 10 may be set in the vehicle V. In this case, by attaching the image capturing unit 10 to the reference position, the position of the image capturing unit 10 is determined, and it is thus unnecessary to re-detect the position.

The approach state image generation unit 42 generates an approach state image B based on the approach information acquired by the approach information acquisition unit 32. The approach state image B is an image showing an approach state of the obstacle to the vehicle V for each position of the vehicle V in the vertical direction. The approach state image B will be described later. Note that since the obstacle detection unit 12 sequentially detects the obstacles, the approach information is also sequentially acquired. Therefore, the approach state image generation unit 42 updates the approach state image B each time the approach information is updated (acquired). However, the approach state image generation unit 42 may update the approach state image B in a case where the approach state changes, that is, in a case where the position that the obstacle approaches changes.

Note that in a case where the obstacle detection unit 12 is attachable to or detachable from the vehicle V, it is preferable that the approach state image generation unit 42 detects a position of the obstacle detection unit 12 each time the obstacle detection unit 12 is attached to the vehicle V and generates the approach state image B based on the position of the obstacle detection unit 12. If the position of the obstacle detection unit 12 is known, it is possible to know to which position the obstacle detection unit 12 detects the approach of the obstacle, and it thus becomes possible to appropriately generate the approach state image B. A known method may be used as the position detection, and for example, an atmospheric pressure sensor or the like may be used as position detection in the vertical direction. In addition, for example, a reference position for attaching each obstacle detection unit 12 may be set in the vehicle V. In this case, by attaching the obstacle detection unit 12 to the reference position, the position of the obstacle detection unit 12 is determined, and it is thus unnecessary to re-detect the position.

The display image generation unit 44 generates the display image P based on the overhead image A generated by the overhead image generation unit 40 and the approach state image B generated by the approach state image generation unit 42. That is, the display image P is an image including the overhead image A and the approach state image B. More specifically, the display image generation unit 44 generates an image in which the overhead image A and the approach state image B are superimposed, as the display image P. The display image generation unit 44 outputs the generated display image P to the display control unit 38. Note that the display image generation unit 44 updates the display image P as the overhead image A and the approach state image B are updated.

The display control unit 38 causes the display unit 14 to display the overhead image A and the approach state image B, that is, the display image P generated by the display image generation unit 44.

(Display Image)

Figure 4:
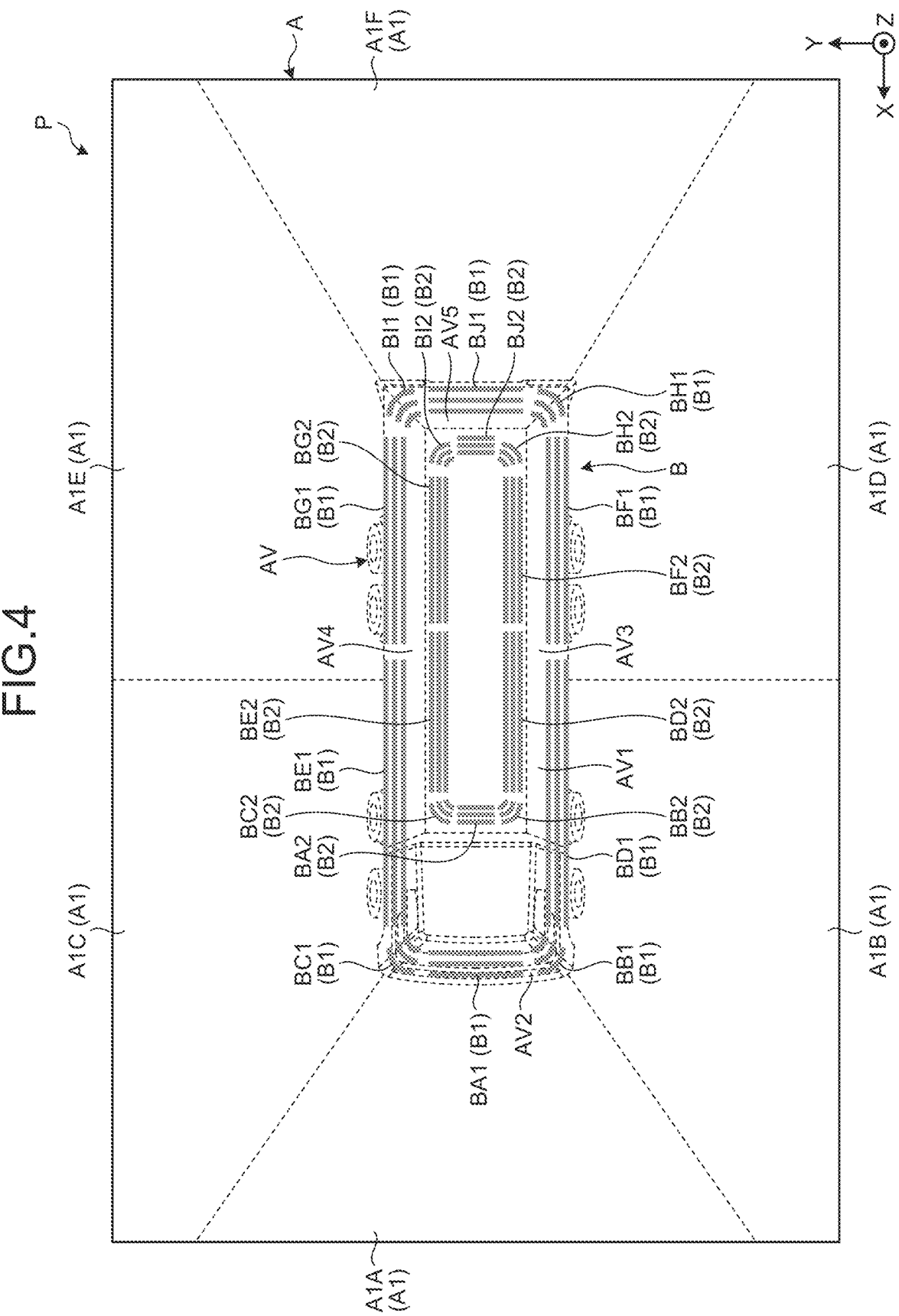
FIG. 4 is a schematic view illustrating a display image according to the first embodiment.

The overhead image generation system 1 has the configuration as described above. Next, the display image P will be described in detail. FIG. 4 is a schematic view illustrating a display image according to the first embodiment. As illustrated in FIG. 4, the display image P is an image in which the approach state image B is superimposed on the overhead image A. The overhead image A includes a surrounding overhead image A1 and an own vehicle image AV displayed inside the surrounding overhead image A1. The surrounding overhead image A1 is an image obtained by converting a peripheral image obtained by capturing an image of the surrounding of the vehicle V into an overhead image viewed from above. In the present embodiment, the surrounding overhead image A1 is a frame-shaped image in which the central portion is missed, and the own vehicle image AV occupies the missed central portion. That is, the own vehicle image AV is surrounded by the surrounding overhead image A1. A position of the missed central portion of the surrounding overhead image A1, that is, a position occupied by the own vehicle image AV indicates a position of the vehicle V in the display image P. Note that the own vehicle image AV and the surrounding overhead image A1 may be divided by a frame line.

The surrounding overhead image A1 has a front image A1A, a left front image A1B, a right front image A1C, a left rear image A1D, a right rear image A1E, and a rear image A1F.

The front image A1A is an overhead image of the front of the vehicle V, and is generated based on the image captured by the image capturing unit 10A. The left front image A1B is located on the left rear of the front image A1A in the display image P, and is an overhead image of the left front of the vehicle V. The left front image A1B is generated based on the image captured by the image capturing unit 10B. The right front image A1C is located on the right rear of the front image A1A in the display image P, and is an overhead image of the right front of the vehicle V. The right front image A1C is generated based on the image captured by the image capturing unit 10C. The left rear image A1D is located behind the left front image A1B in the display image P, and is an overhead image of the left rear of the vehicle V. The left rear image A1D is generated based on the image captured by the image capturing unit 10D. The right rear image A1E is located behind the right front image A1C in the display image P, and is an overhead image of the right rear of the vehicle V. The right rear image A1E is generated based on the image captured by the image capturing unit 10E. The rear image A1F is located behind the left rear image A1D and the right rear image A1E in the display image P, and is an overhead image of the rear of the vehicle V. The rear image A1F is generated based on the image captured by the image capturing unit 10F. In an example of FIG. 4, the front image A1A, the left front image A1B, the right front image A1C, the left rear image A1D, and the right rear image A1E are divided by frame lines, but may actually be a continuous image without being divided.

The own vehicle image AV is an image located in a central portion of the overhead image A, that is, a central portion surrounded by the surrounding overhead image A1, and is an image showing the vehicle V. The own vehicle image AV includes information on a position of the vehicle V in each vertical direction. That is, the own vehicle image AV displays each part of the vehicle V in the vertical direction at a different position on an XY plane (plane parallel to the X direction and the Y direction). Generally, in a case where an image of the vehicle V is displayed in the overhead image A, the image of the vehicle V is an image viewed from above in the vertical direction, and thus, is an image reflecting only an upper surface in the vertical direction. Therefore, the image of the vehicle V in this case includes an image of a part along the XY plane (plane parallel to the X direction and the Y direction), but does not include an image of a part of each position in the vertical direction (Z direction). On the other hand, the overhead image generation unit 40 generates the own vehicle image AV so as to display each part of the vehicle V in the vertical direction at a different position to make the own vehicle image AV an image including information on each position in the vertical direction. Hereinafter, the own vehicle image AV will be more specifically described.

In the first embodiment, the overhead image generation unit 40 generates a development view of the vehicle V centered on an upper surface AV1, which is an image of the surface of the upper side of the vehicle V in the vertical direction, as the own vehicle image AV. That is, the own vehicle image AV is an image in which the upper surface AV1 is in the center and a front surface AV2, a left surface AV3, a right surface AV4, and a rear surface AV5, which are images of surfaces other than the upper surface AV1 of the vehicle V, surround the upper surface AV1. The front surface AV2 is an image of a surface of the front side of the vehicle V, and is located in front of the upper surface AV1 in the own vehicle image AV. The left surface AV3 is an image of a left surface of the vehicle V, and is located on a left side of the upper surface AV1 in the own vehicle image AV. The right surface AV4 is an image of a surface of a right side of the vehicle V, and is located on a right side of the upper surface AV1 in the own vehicle image AV. The rear surface AV5 is an image of a surface of the rear side of the vehicle V, and is located behind the upper surface AV1 in the own vehicle image AV. The front surface AV2, the left surface AV3, the right surface AV4, and the rear surface AV5 are images falling down toward the upper surface AV1 side, and thus, are images showing the part of the upper side of the vehicle V in the vertical direction toward the upper surface AV1 side (center side).

As such, the own vehicle image AV is a development view of the vehicle V, and is an image including the front surface AV2, the left surface AV3, the right surface AV4, and the rear surface AV5. Since the front surface AV2, the left surface AV3, the right surface AV4, and the rear surface AV5 are surfaces that extend in the vertical direction, it can be said that they are images including information (visual information such as a shape, a pattern, a color, or the like) on each position of the vehicle V in the vertical direction. Therefore, it can be said that the own vehicle image AV, which is a development view, is an image including information on each position of the vehicle V in the vertical direction. Note that the own vehicle image AV is not limited to the development view of the vehicle V as long as it is the image including the information on each position of the vehicle V in the vertical direction. For example, the own vehicle image AV is only required to include an image (hereinafter referred to as a lower side own vehicle image) showing a place of a lower side of the vehicle V in the vertical direction and an image (hereinafter referred to as an upper side own vehicle image) showing a place of an upper side of the vehicle V in the vertical direction as compared with the lower side own vehicle image. In this case, for example, in the own vehicle image AV, it is preferable that the upper side own vehicle image is located inside the lower side own vehicle image in a radial direction when viewed from the Z direction. In addition, it can be said that it is preferable that the own vehicle image AV is an image generated so as to show the place of the upper side of the vehicle V in the vertical direction toward an inner side (center side).

The own vehicle image AV is a still image generated in advance, and is not an image sequentially updated like the surrounding overhead image A1 captured by the image capturing unit 10. However, the own vehicle image AV may be an image generated based on the image captured by the image capturing unit and sequentially updated. In addition, usually, the development view of the vehicle V becomes larger than that in a case where the vehicle V is viewed from the upper side in the vertical direction, by pictures of side surfaces developed outward. However, the own vehicle image AV is reduced and generated so as to be the same as a size of the vehicle V when viewed from above in the vertical direction. That is, in the display image P, a size of a region occupied by the own vehicle image AV is preset with respect to an entire size of the display image P. The own vehicle image AV is reduced and generated so as to fall within the region occupied by the own vehicle image AV. In other words, the own vehicle image AV is generated so that a ratio of a size of the own vehicle image AV to the entire size of the display image P is equal to a ratio of a size of the vehicle V to a size of an entire region appearing in the display image P when viewed from a common top viewpoint in the vertical direction.

Next, the approach state image B will be described. The approach state image B is an image showing an approach state of the obstacle to the vehicle V for each position of the vehicle V in the vertical direction. In addition, the approach state image B is an image showing the approach state of an obstacle to the vehicle V for each position around the vehicle V (in a peripheral direction of the vehicle V with the vertical direction as a central axis). As illustrated in FIG. 4, the approach state image B has a lower side approach state image B1, which is a frame-shaped image, and an upper side approach state image B2, which is a frame-shaped image located inside the lower side approach state image B1. The lower side approach state image B1 is an image showing an approach state of the obstacle to the place of the lower side of the vehicle V in the vertical direction. The upper side approach state image B2 is an image showing an approach state of the obstacle to the place of the upper side of the vehicle V in the vertical direction, and furthermore, is an image showing an approach state of the obstacle to the upper side of the vehicle V in the vertical direction as compared with the lower side approach state image B1.

In the example of FIG. 4, the lower side approach state image B1 has lower side approach state images BA1, BB1, BC1, BD1, BE1, BF1, BG1, BH1, BI1, and BJ1. The lower side approach state images BA1, BB1, BC1, BD1, BE1, BF1, BG1, BH1, BI1, and BJ1 are images showing approach information to different positions of positions around the vehicle V, respectively. The upper side approach state image B2 has upper side approach state images BA2, BB2, BC2, BD2, BE2, BF2, BG2, BH2, BI2, and BJ2. The upper side approach state images BA2, BB2, BC2, BD2, BE2, BF2, BG2, BH2, BI2, and BJ2 are images showing approach information to different positions of positions around the vehicle V, respectively.

The lower side approach state image BA1 is an image showing whether or not there is an obstacle approaching the place of the front side and the lower side of the vehicle V. The lower side approach state image BA1 is an image (icon) reporting that there is an obstacle in a case where the approach information acquisition unit 32 has acquired the approach information indicating that an obstacle is approaching the place of the front side and the lower side of the vehicle V, that is, in a case where the obstacle detection unit 12A1 has detected that there is an obstacle. The lower side approach state image BA1 is superimposed and displayed on a position of a front side of the own vehicle image AV. In the present embodiment, the lower side approach state image BA1 is composed of a triple line extending in a left and right direction (direction Y) along the front side of the own vehicle image AV.

A display content of the lower side approach state image BA1 differs in a case where it has been detected that there is an obstacle approaching the place of the front side and the lower side of the vehicle V and in a case where it has been detected that there is no obstacle approaching the place of the front side and the lower side of the vehicle V. For example, the lower side approach state image BA1 is displayed in a predetermined color such as green or the like in a case where there is no obstacle approaching the place of the front side and the lower side of the vehicle V, and is displayed in a color different from that in a case where there is no obstacle approaching the place of the front side and the lower side of the vehicle V, such as yellow or the like in a case where there is an obstacle approaching the place of the front side and the lower side of the vehicle V. In addition, a display content of the lower side approach state image BA1 may be changed according to a distance to the obstacle even in a case there is an obstacle approaching the place of the front side and the lower side of the vehicle V. For example, the lower side approach state image BA1 may be displayed in yellow in a case where the distance to the obstacle is less than a first predetermined distance and is equal to or larger than a second predetermined distance smaller than the first predetermined distance, and be displayed in red in a case where the distance to the obstacle is less than the second predetermined distance. However, the display content of the lower side approach state image BA1 is not limited thereto, is arbitrary, and is only required to differ in a case where it has been detected that there is an obstacle approaching the place of the front side and the lower side of the vehicle V and in a case where it has been detected that there is no obstacle approaching the place of the front side and the lower side of the vehicle V. For example, the lower side approach state image BA1 may change the number or shapes of lines in a case where there is an obstacle approaching the place of the front side and the lower side of the vehicle V and in a case where there is no obstacle approaching the place of the front side and the lower side of the vehicle V, and display a character, a mark or the like indicating that there is an obstacle in a case where there is an obstacle approaching the place of the front side and the lower side of the vehicle V. Note that also in the other approach state images B, a display method in a case where it has been detected that there is an obstacle approaching the vehicle and in a case where it has detected that there is no obstacle approaching the vehicle is similar to that in the lower side approach state image BA1.

The upper side approach state image BA2 is an image showing whether or not there is an obstacle approaching the place of the front side and the upper side of the vehicle V. The upper side approach state image BA2 is an image (icon) reporting that there is an obstacle in a case where the approach information acquisition unit 32 has acquired the approach information indicating that an obstacle is approaching the place of the front side and the upper side of the vehicle V, that is, in a case where the obstacle detection unit 12A2 has detected that there is an obstacle. The upper side approach state image BA2 is displayed on a position of the front side of the own vehicle image AV and inside the lower side approach state image BA1. In the present embodiment, the upper side approach state image BA2 is composed of a triple line extending in the left and right direction (direction Y) along the front side of the own vehicle image AV.

The lower side approach state image BB1 is an image showing whether or not there is an obstacle approaching the place of the lower side of the corner of the left front side of the vehicle V. The lower side approach state image BB1 is an image (icon) reporting that there is an obstacle in a case where the approach information acquisition unit 32 has acquired the approach information indicating that an obstacle is approaching the place of the lower side of the corner of the left front side of the vehicle V, that is, in a case where the obstacle detection unit 12B1 has detected that there is an obstacle. The lower side approach state image BB1 is displayed on a position of a corner of a left front side of the own vehicle image AV. In the present embodiment, the lower side approach state image BB1 is composed of a triple curved line along the corner of the left front side of the own vehicle image AV.

The upper side approach state image BB2 is an image showing whether or not there is an obstacle approaching the place of the upper side of the corner of the left front side of the vehicle V. The upper side approach state image BB2 is an image (icon) reporting that there is an obstacle in a case where the approach information acquisition unit 32 has acquired the approach information indicating that an obstacle is approaching the place of the upper side of the corner of the left front side of the vehicle V, that is, in a case where the obstacle detection unit 12B2 has detected that there is an obstacle. The upper side approach state image BB2 is displayed on a position of a corner of the left front side of the own vehicle image AV and inside the lower side approach state image BB1. In the present embodiment, the upper side approach state image BB2 is composed of a triple curved line along the corner of the left front side of the own vehicle image AV.

The lower side approach state image BC1 is an image showing whether or not there is an obstacle approaching the place of the lower side of the corner of the right front side of the vehicle V. The lower side approach state image BC1 is an image (icon) reporting that there is an obstacle in a case where the approach information acquisition unit 32 has acquired the approach information indicating that an obstacle is approaching the place of the lower side of the corner of the right front side of the vehicle V, that is, in a case where the obstacle detection unit 12C1 has detected that there is an obstacle. The lower side approach state image BC1 is displayed on a position of a corner of a right front side of the own vehicle image AV. In the present embodiment, the lower side approach state image BC1 is composed of a triple curved line along the corner of the right front side of the own vehicle image AV.

The upper side approach state image BC2 is an image showing whether or not there is an obstacle approaching the place of the upper side of the corner of the right front side of the vehicle V. The upper side approach state image BC2 is an image (icon) reporting that there is an obstacle in a case where the approach information acquisition unit 32 has acquired the approach information indicating that an obstacle is approaching the place of the upper side of the corner of the right front side of the vehicle V, that is, in a case where the obstacle detection unit 12C2 has detected that there is an obstacle. The upper side approach state image BC2 is displayed on a position of a corner of the right front side of the own vehicle image AV and inside the lower side approach state image BC1. In the present embodiment, the upper side approach state image BC2 is composed of a triple curved line along the corner of the right front side of the own vehicle image AV.

The lower side approach state image BD1 is an image showing whether or not there is an obstacle approaching the place of the lower side of the left front side of the vehicle V. The lower side approach state image BD1 is an image (icon) reporting that there is an obstacle in a case where the approach information acquisition unit 32 has acquired the approach information indicating that an obstacle is approaching the place of the lower side of the left front side of the vehicle V, that is, in a case where the obstacle detection unit 12D1 has detected that there is an obstacle. The lower side approach state image BD1 is displayed on a position of the left front side of the own vehicle image AV and behind the lower side approach state image BB1. In the present embodiment, the lower side approach state image BD1 is composed of a triple line extending in a front and rear direction (X direction) along a left side of the own vehicle image AV.

The upper side approach state image BD2 is an image showing whether or not there is an obstacle approaching the place of the upper side of the left front side of the vehicle V. The upper side approach state image BD2 is an image (icon) reporting that there is an obstacle in a case where the approach information acquisition unit 32 has acquired the approach information indicating that an obstacle is approaching the place of the upper side of the left front side of the vehicle V, that is, in a case where the obstacle detection unit 12D2 has detected that there is an obstacle. The upper side approach state image BD2 is displayed on the left front side of the own vehicle image AV and behind the upper side approach state image BB2, and is displayed on a position inside the lower side approach state image BD1. In the present embodiment, the upper side approach state image BD2 is composed of a triple line extending in the front and rear direction (X direction) along the left side of the own vehicle image AV.

The lower side approach state image BE1 is an image showing whether or not there is an obstacle approaching the place of the lower side of the right front side of the vehicle V. The lower side approach state image BE1 is an image (icon) reporting that there is an obstacle in a case where the approach information acquisition unit 32 has acquired the approach information indicating that an obstacle is approaching the place of the lower side of the right front side of the vehicle V, that is, in a case where the obstacle detection unit 12E1 has detected that there is an obstacle. The lower side approach state image BE1 is displayed on a position of the right front side of the own vehicle image AV and behind the lower side approach state image BC1. In the present embodiment, the lower side approach state image BE1 is composed of a triple line extending in the front and rear direction (X direction) along a right side of the own vehicle image AV.

The upper side approach state image BE2 is an image showing whether or not there is an obstacle approaching the place of the upper side of the right front side of the vehicle V. The upper side approach state image BE2 is an image (icon) reporting that there is an obstacle in a case where the approach information acquisition unit 32 has acquired the approach information indicating that an obstacle is approaching the place of the upper side of the right front side of the vehicle V, that is, in a case where the obstacle detection unit 12E2 has detected that there is an obstacle. The upper side approach state image BE2 is displayed on the right front side of the own vehicle image AV and behind the upper side approach state image BC2, and is displayed on a position inside the lower side approach state image BE1. In the present embodiment, the upper side approach state image BE2 is composed of a triple line extending in the front and rear direction (X direction) along the right side of the own vehicle image AV.

The lower side approach state image BF1 is an image showing whether or not there is an obstacle approaching the place of the lower side of the left rear side of the vehicle V. The lower side approach state image BF1 is an image (icon) reporting that there is an obstacle in a case where the approach information acquisition unit 32 has acquired the approach information indicating that an obstacle is approaching the place of the lower side of the left rear side of the vehicle V, that is, in a case where the obstacle detection unit 12F1 has detected that there is an obstacle. The lower side approach state image BF1 is displayed on a position of a left rear side of the own vehicle image AV and behind the lower side approach state image BD1. In the present embodiment, the lower side approach state image BF1 is composed of a triple line extending in the front and rear direction (X direction) along the left side of the own vehicle image AV.

The upper side approach state image BF2 is an image showing whether or not there is an obstacle approaching the place of the upper side of the left rear side of the vehicle V. The upper side approach state image BF2 is an image (icon) reporting that there is an obstacle in a case where the approach information acquisition unit 32 has acquired the approach information indicating that an obstacle is approaching the place of the upper side of the left rear side of the vehicle V, that is, in a case where the obstacle detection unit 12F2 has detected that there is an obstacle. The upper side approach state image BF2 is displayed on the left rear side of the own vehicle image AV and behind the upper side approach state image BD2, and is displayed on a position inside the lower side approach state image BF1. In the present embodiment, the upper side approach state image BF2 is composed of a triple line extending in the front and rear direction (X direction) along the left side of the own vehicle image AV.

The lower side approach state image BG1 is an image showing whether or not there is an obstacle approaching the place of the lower side of the right rear side of the vehicle V. The lower side approach state image BG1 is an image (icon) reporting that there is an obstacle in a case where the approach information acquisition unit 32 has acquired the approach information indicating that an obstacle is approaching the place of the lower side of the right rear side of the vehicle V, that is, in a case where the obstacle detection unit 12G1 has detected that there is an obstacle. The lower side approach state image BG1 is displayed on a position of a right rear side of the own vehicle image AV and behind the lower side approach state image BE1. In the present embodiment, the lower side approach state image BG1 is composed of a triple line extending in the front and rear direction (X direction) along the right side of the own vehicle image AV.

The upper side approach state image BG2 is an image showing whether or not there is an obstacle approaching the place of the upper side of the right rear side of the vehicle V. The upper side approach state image BG2 is an image (icon) reporting that there is an obstacle in a case where the approach information acquisition unit 32 has acquired the approach information indicating that an obstacle is approaching the place of the upper side of the right rear side of the vehicle V, that is, in a case where the obstacle detection unit 12G2 has detected that there is an obstacle. The upper side approach state image BG2 is displayed on the right rear side of the own vehicle image AV and behind the upper side approach state image BE2, and is displayed on a position inside the lower side approach state image BG1. In the present embodiment, the upper side approach state image BG2 is composed of a triple line extending in the front and rear direction (X direction) along the right side of the own vehicle image AV.

The lower side approach state image BH1 is an image showing whether or not there is an obstacle approaching the place of the lower side of the corner of the left rear side of the vehicle V. The lower side approach state image BH1 is an image (icon) reporting that there is an obstacle in a case where the approach information acquisition unit 32 has acquired the approach information indicating that an obstacle is approaching the place of the lower side of the corner of the left rear side of the vehicle V, that is, in a case where the obstacle detection unit 12H1 has detected that there is an obstacle. The lower side approach state image BH1 is displayed on a position of a corner of a left rear side of the own vehicle image AV and behind the lower side approach state image BF1. In the present embodiment, the lower side approach state image BH1 is composed of a triple curved line along the corner of the left rear side of the own vehicle image AV.

The upper side approach state image BH2 is an image showing whether or not there is an obstacle approaching the place of the upper side of the corner of the left rear side of the vehicle V. The upper side approach state image BH2 is an image (icon) reporting that there is an obstacle in a case where the approach information acquisition unit 32 has acquired the approach information indicating that an obstacle is approaching the place of the upper side of the corner of the left rear side of the vehicle V, that is, in a case where the obstacle detection unit 12H2 has detected that there is an obstacle. The upper side approach state image BH2 is displayed on a position of the corner of the left rear side of the own vehicle image AV and behind the upper side approach state image BF2, and is displayed on a position inside the lower side approach state image BH1. In the present embodiment, the upper side approach state image BH2 is composed of a triple curved line along the corner of the left rear side of the own vehicle image AV.

The lower side approach state image BI1 is an image showing whether or not there is an obstacle approaching the place of the lower side of the corner of the right rear side of the vehicle V. The lower side approach state image BI1 is an image (icon) reporting that there is an obstacle in a case where the approach information acquisition unit 32 has acquired the approach information indicating that an obstacle is approaching the place of the lower side of the corner of the right rear side of the vehicle V, that is, in a case where the obstacle detection unit 12I1 has detected that there is an obstacle. The lower side approach state image BI1 is displayed on a position of a corner of a right rear of the own vehicle image AV and behind the lower side approach state image BG1. In the present embodiment, the lower side approach state image BI1 is composed of a triple curved line along the corner of the right rear of the own vehicle image AV.

The upper side approach state image BI2 is an image showing whether or not there is an obstacle approaching the place of the upper side of the corner of the right rear side of the vehicle V. The upper side approach state image BI2 is an image (icon) reporting that there is an obstacle in a case where the approach information acquisition unit 32 has acquired the approach information indicating that an obstacle is approaching the place of the upper side of the corner of the right rear side of the vehicle V, that is, in a case where the obstacle detection unit 12I2 has detected that there is an obstacle. The upper side approach state image BI2 is displayed on the corner of the right rear of the own vehicle image AV and behind the upper side approach state image BG2, and is displayed on a position inside the lower side approach state image BI1. In the present embodiment, the upper side approach state image BI2 is composed of a triple curved line along the corner of the right rear of the own vehicle image AV.

The lower side approach state image BJ1 is an image showing whether or not there is an obstacle approaching the place of the lower side of the rear side of the vehicle V. The lower side approach state image BJ1 is an image (icon) reporting that there is an obstacle in a case where the approach information acquisition unit 32 has acquired the approach information indicating that an obstacle is approaching the place of the lower side of the rear side of the vehicle V, that is, in a case where the obstacle detection unit 12J1 has detected that there is an obstacle. The lower side approach state image BJ1 is displayed on a position of a rear side of the own vehicle image AV. In the present embodiment, the lower side approach state image BG1 is composed of a triple line extending in the left and right direction (Y direction) along the rear side of the own vehicle image AV.

The upper side approach state image BJ2 is an image showing whether or not there is an obstacle approaching the place of the upper side of the rear side of the vehicle V. The upper side approach state image BJ2 is an image (icon) reporting that there is an obstacle in a case where the approach information acquisition unit 32 has acquired the approach information indicating that an obstacle is approaching the place of the upper side of the rear side of the vehicle V, that is, in a case where the obstacle detection unit 12J2 has detected that there is an obstacle. The upper side approach state image BJ2 is displayed on a position of the rear side of the own vehicle image AV and inside the lower side approach state image BJ1. In the present embodiment, the upper side approach state image BJ2 is composed of a triple line extending in the left and right direction (X direction) along the rear side of the own vehicle image AV. Note that each of the approach state images B described above is composed of triple lines, but a shape thereof is not limited thereto and is arbitrary.

As such, the approach state image B is divided and displayed for each section around the vehicle V viewed from the vertical direction, in other words, a plurality of approach state image B are displayed along the surrounding of the own vehicle image AV. Therefore, according to the approach state image B, it is possible to recognize which position around the vehicle V the obstacle is approaching. In addition, the approach state image B has the lower side approach state image B1 and the upper side approach state image B2. Therefore, according to the approach state image B, it is possible to recognize which position of the vehicle V in the vertical direction the obstacle is approaching. Note that the upper side approach state image B2 is displayed inside the display image P, that is, on a central portion side of the overhead image A, as compared with the lower side approach state image B1. In the present embodiment, the lower side approach state image B1 is displayed outside the surface AV1 in the own vehicle image AV. In addition, the upper side approach state image B2 is displayed inside the lower side approach state image B1 in the own vehicle image AV, and furthermore, is displayed in the surface AV1. However, positions where the lower side approach state image B1 and the upper side approach state image B2 are displayed are not limited thereto. For example, at least one of the lower side approach state image B1 and the upper side approach state image B2 may be displayed outside the own vehicle image AV, that is, in the surrounding overhead image A1. In this case, for example, the lower side approach state image B1 may be displayed in the surrounding overhead image A1 and the upper side approach state image B2 may be displayed in the own vehicle image AV or both the lower side approach state image B1 and the upper side approach state image B2 may be displayed in the surrounding overhead image A1.

Note that as long as the approach state image B shows the approach state for each position of the vehicle V in the vertical direction, the number and positions of approach state images B are not limited to those described above and are arbitrary. In addition, in the above description, the approach state image B has been generated to correspond to a detection result of each obstacle detection unit 12. However, the approach state image B may be displayed based on detection results of the plurality of obstacle detection units 12. For example, a front lower side approach state image B1A may be generated based on detection results of the obstacle detection units 12A1, 12B1, and 12C1. In addition, a plurality of approach state images B may be generated based on a detection result of one obstacle detection unit 12. For example, a lower side approach state image B1A on a front lower side and an upper side approach state image B2A on a front upper side may be generated based on a detection result of the obstacle detection unit 12A1.

Figure 5:
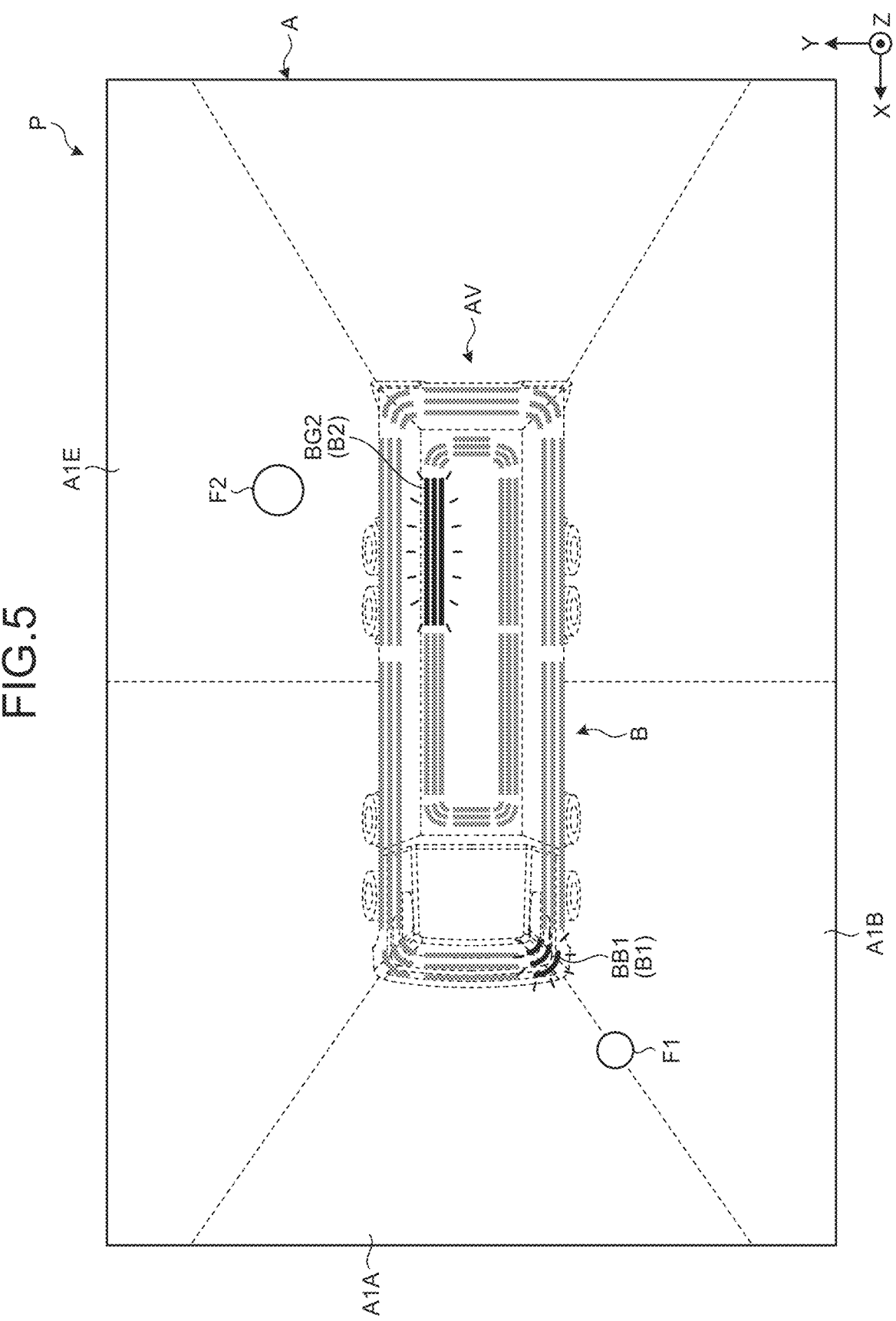
FIG. 5 is a schematic view illustrating a display image according to the first embodiment.

FIG. 5 is a schematic view illustrating a display image according to the first embodiment. FIG. 4 illustrates an example of a case where there is no obstacle approaching the vehicle V, but FIG. 5 illustrates a display image P in a case where there is an obstacle approaching the vehicle V. Here, a case where there are an obstacle S1 approaching the lower side of the corner of the left front side of the vehicle V and an obstacle S2 approaching the upper side of the right rear side of the vehicle V is taken as an example (see FIG. 1). In this case, as illustrated in FIG. 5, in the display image P, an obstacle image F1, which is a captured image of the obstacle S1, is displayed on a position of a corner of a left front of the surrounding overhead image A1, and an obstacle image F2, which is a captured image of the obstacle S2, is displayed on a position of a right rear of the surrounding overhead image A1. Then, in the approach state image B, the lower side approach state image BB1 and the upper side approach state image BG2 are indications indicating that there are obstacles approaching the corresponding positions of the vehicle V.

Figure 6:
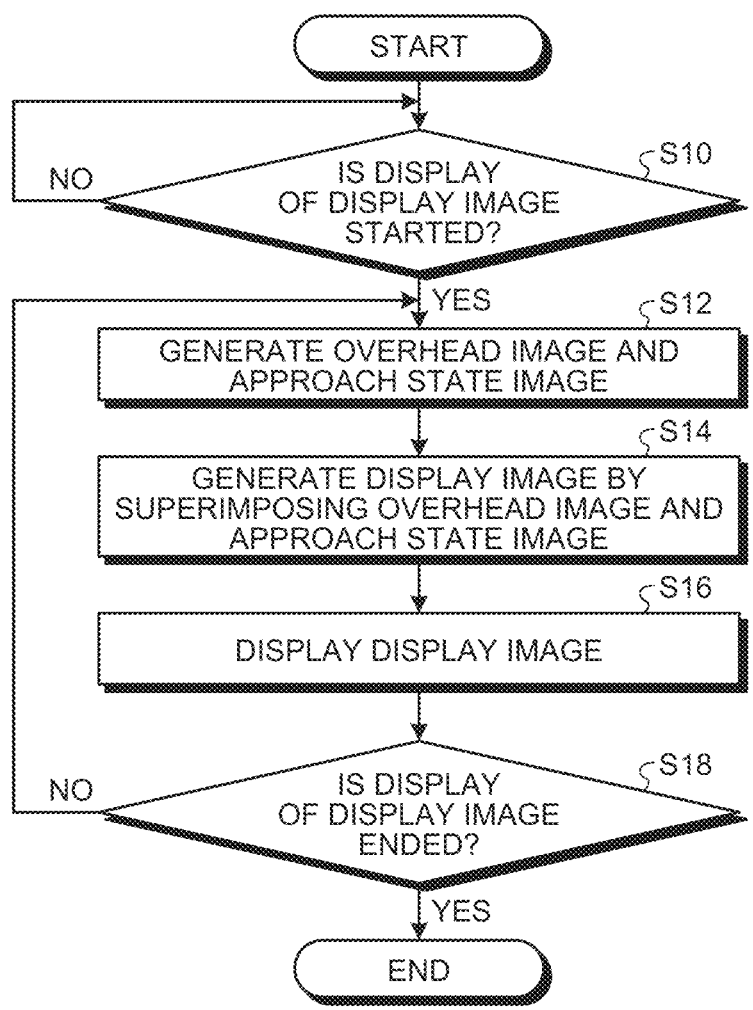
FIG. 6 is a flowchart for describing a display flow of a display image according to the first embodiment.

The display image P is the image as described above. Next, a display flow of the display image P by the control unit 22 of the overhead image generation device 20 will be described. FIG. 6 is a flowchart for describing a display flow of a display image according to the first embodiment. As illustrated in FIG. 6, the control unit 22 determines whether or not to start display of the display image P (Step S10). The control unit 22 determines whether or not to start the display of the display image P based on the vehicle information acquired by the vehicle information acquisition unit 34. For example, the control unit 22 determines to disclose the display of the display image P in a case where there is a reverse trigger of the vehicle V, and determines not to start the display of the display image P in a case where there is no reverse trigger. The reverse trigger means, for example, that a shift position is "reverse". Alternatively, the reverse trigger means that a traveling direction of the vehicle V is rearward in a front and rear direction of the vehicle V. However, a trigger of the display of the display image P is not limited to the reverse trigger, and can be set arbitrarily. For example, the display image P may be always displayed or may be started to be displayed by an operation of the driver.

In a case where the display of the display image P is not started (Step S10: No), the processing returns to Step S10. In a case where the display of the display image P is started (Step S10: Yes), the control unit 22 generates the overhead image A and the approach state image B by the overhead image generation unit 40 and the approach state image generation unit 42 (Step S12). The overhead image generation unit 40 generates an image in which the surrounding overhead image A1 looking down on the surrounding of the vehicle V from above in the vertical direction and the own vehicle image AV are superimposed, as the overhead image A. The approach state image generation unit 42 generates an image showing the approach state of the obstacle to the vehicle V for each position of the vehicle V as the approach state image B. After generating the overhead image A and the approach state image B, the control unit 22 generates the display image P by superimposing the overhead image A and the approach state image B by the display image generation unit 44 (Step S14), and causes the display unit 14 to display the generated display image P by the display control unit 38 (Step S16). Thereafter, the control unit 22 determines whether or not to end the display of the display image P (Step S18), and in a case where the display is not ended (Step S18: No), the processing returns to Step S12 and the control unit 22 updates the overhead image A and the approach state image B to update and display the display image P. In a case where the display is ended (Step S18: Yes), the present processing ends.

As described above, the overhead image generation device 20 according to the first embodiment includes the image acquisition unit 30, the approach information acquisition unit 32, the overhead image generation unit 40, the approach state image generation unit 42, and the display control unit 38. The image acquisition unit 30 acquires the peripheral image by capturing an image of the periphery of the vehicle V. The approach information acquisition unit 32 acquires approach information indicating an approach state of the obstacle detected in the periphery of the vehicle V to the vehicle V. The overhead image generation unit 40 generates the overhead image A from the peripheral image by performing viewpoint conversion processing so as to look down on the vehicle V from above in the vertical direction. The approach state image generation unit 42 generates the approach state image B based on the approach information. The approach state image B is an image showing an approach state of the obstacle to the vehicle V for each position of the vehicle V in the vertical direction. The display control unit 38 superimposes the overhead image A and the approach state image B and causes the display unit 14 to display the superimposed image.

Conventionally, there is a case of displaying an overhead image showing a situation around the vehicle V to notify the driver whether or not there is an obstacle approaching the vehicle V. However, the overhead image is an image of the vehicle V viewed from above in the vertical direction. For this reason, in a case where the overhead image is used, it is possible to cause the driver to recognize which position around the vehicle V the obstacle is approaching, but it is difficult to cause the driver to recognize which position of the vehicle V in the vertical direction the obstacle is approaching. For example, by displaying a plurality of videos from different viewpoints, it is also possible to cause the driver to recognize which position of the vehicle V in the vertical direction the obstacle is approaching, but viewing the plurality of videos at the same time increases a burden of the driver. On the other hand, the overhead image generation device 20 according to the present embodiment superimposes and displays the overhead image A, which is an overhead image of the periphery of the vehicle V, and the approach state image B showing the approach state of the obstacle for each position of the vehicle V in the vertical direction. For this reason, according to the overhead image generation device 20, the display image P in which the overhead image A and the approach state image B are superimposed is displayed, and thus, the driver can appropriately recognize which position of the vehicle V in the vertical direction the obstacle is approaching only by looking at one display image P. Therefore, according to the overhead image generation device 20, it is possible to cause the driver to appropriately recognize which position of the vehicle V the obstacle is approaching. In a case where the vehicle V is a large vehicle, the vehicle V is high in the vertical direction, such that it is particularly effective to use the overhead image generation device 20.

In addition, the overhead image generation unit 40 generates the overhead image A so that the own vehicle image AV showing the vehicle V is located at the central portion of the overhead image A. The own vehicle image AV includes information on the position of the vehicle V in the vertical direction. The overhead image generation device 20 displays the own vehicle image AV including the information on the position of the vehicle V in each vertical direction, in addition to the approach state image B. Therefore, the driver can more suitably recognize which position of the vehicle V in the vertical direction the obstacle is approaching by visually recognizing the approach state image B and the own vehicle image AV at the same time. Therefore, the driver can recognize which position of the vehicle V the obstacle is approaching in the own vehicle image AV while roughly visually recognizing a position of the obstacle approaching the vehicle in the approach state image B.

In addition, the overhead image generation unit 40 generates the overhead image A by using the development view centered on the surface AV1 of the upper side of the vehicle V in the vertical direction as the own vehicle image AV. The overhead image generation device 20 can cause the driver to more suitably recognize which position of the vehicle V the obstacle is approaching by using the own vehicle image AV as the development view of the vehicle V.

In addition, the approach state image generation unit 42 divides and generates the approach state image B for each section around the vehicle V viewed from the vertical direction. The approach state image generation unit 42 can cause the driver to more suitably recognize which position of the vehicle V in the vertical direction and which position of the vehicle V in the peripheral direction the obstacle is approaching by dividing the approach state image B for each section around the vehicle V.

In addition, the approach state image generation unit 42 generates the lower side approach state image B1 and the upper side approach state image B2 as the approach state image B. The lower side approach state image B1 is an image showing the approach state of the obstacle to the vehicle V. The upper side approach state image B2 is an image showing an approach state of the obstacle to the upper side of the vehicle V in the vertical direction as compared with the lower side approach state image B1. The overhead image generation device 20 can cause the driver to appropriately recognize which position of the vehicle V in the vertical direction the obstacle is approaching by displaying the lower side approach state image B1 and the upper side approach state image B2. Note that only one of the lower side approach state image B1 and the upper side approach state image B2 may be displayed. In this case, the driver may be able to perform switching to display only one or both of the lower side approach state image B1 and the upper side approach state image B2.

In addition, the approach state image generation unit 42 generates the approach state image B so that the upper side approach state image B2 is displayed on the central portion side of the overhead image A as compared with the lower side approach state image B1. The overhead image generation device 20 makes it possible to cause the driver to intuitively recognize the approach information in the vertical direction by displaying the upper side approach state image B2 showing the approach state to the upper side in the vertical direction on a center side (inside) of a screen.

In addition, the overhead image generation system 1 includes the overhead image generation device 20, the display unit 14, the image capturing unit 10 that acquires the peripheral image by capturing an image of the periphery of the vehicle V, and the obstacle detection unit 12 that detects the obstacle in the periphery of the vehicle V. The overhead image generation system 1 includes the overhead image generation device 20, and can thus cause the driver to appropriately recognize which position of the vehicle V in the vertical direction the obstacle is approaching.

Figure 7:
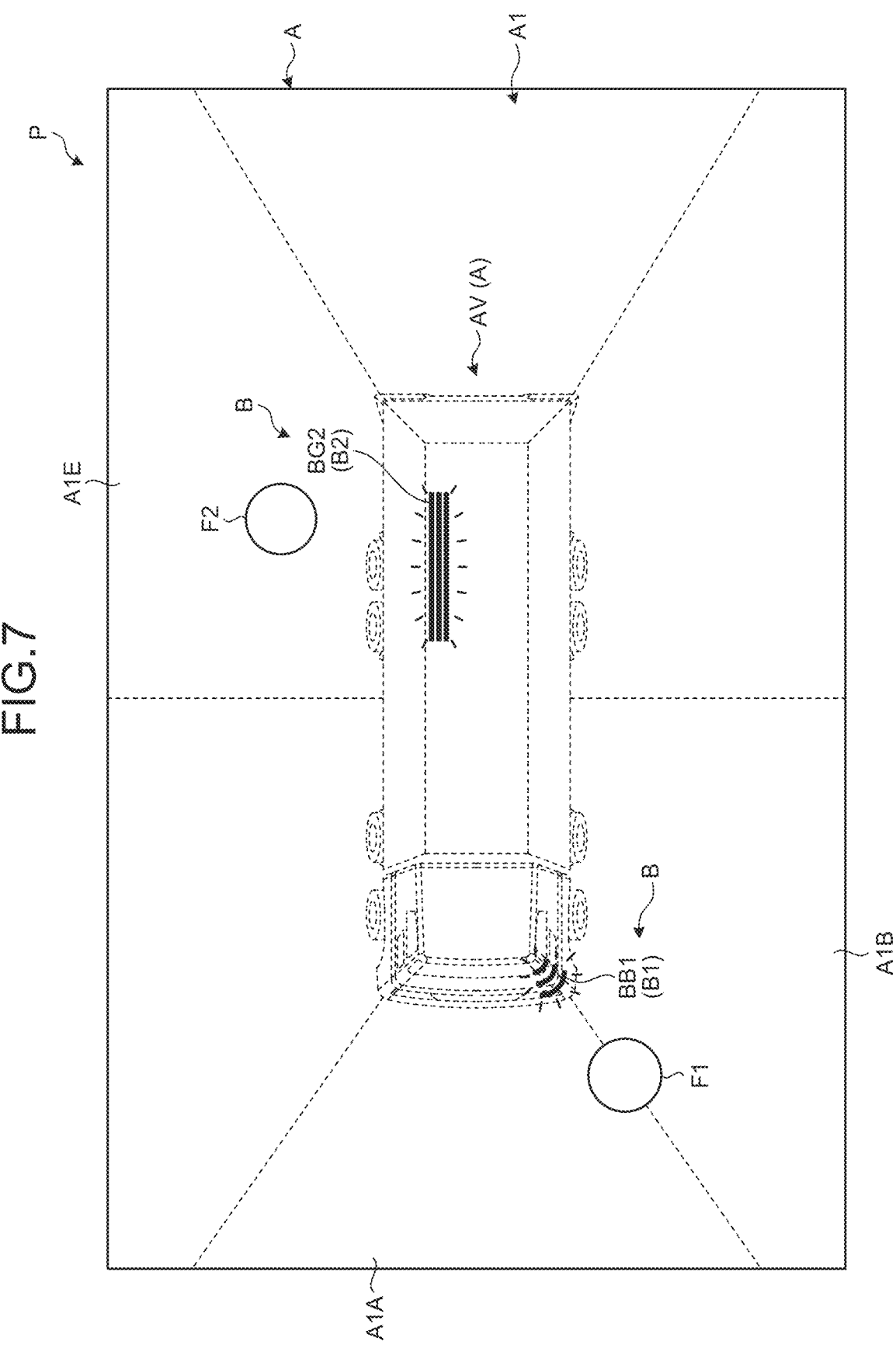
FIG. 7 is a diagram illustrating another example of a display image of the first embodiment.
Figure 8:
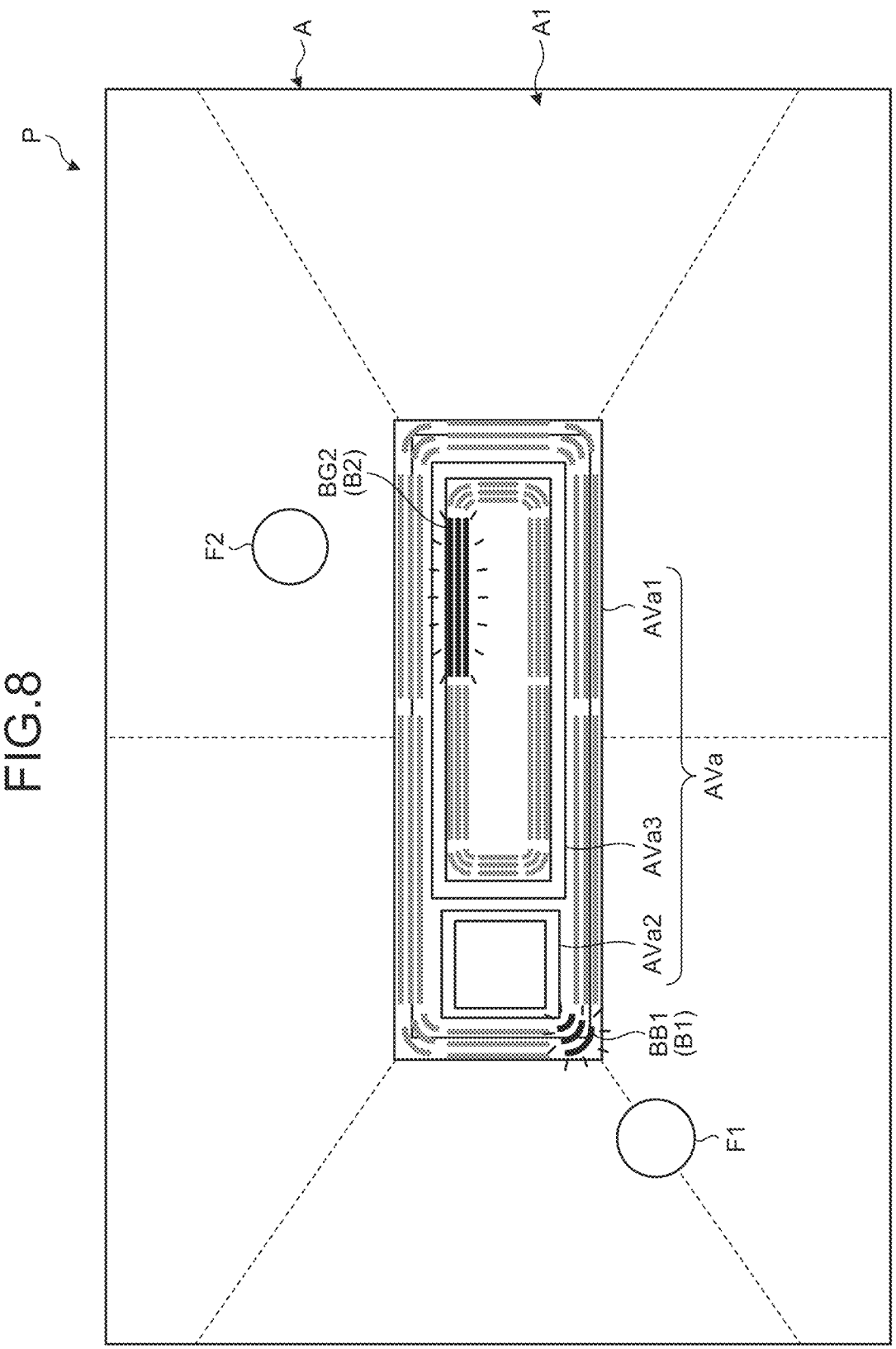
FIG. 8 is a diagram illustrating another example of a display image of the first embodiment.
Figure 9:
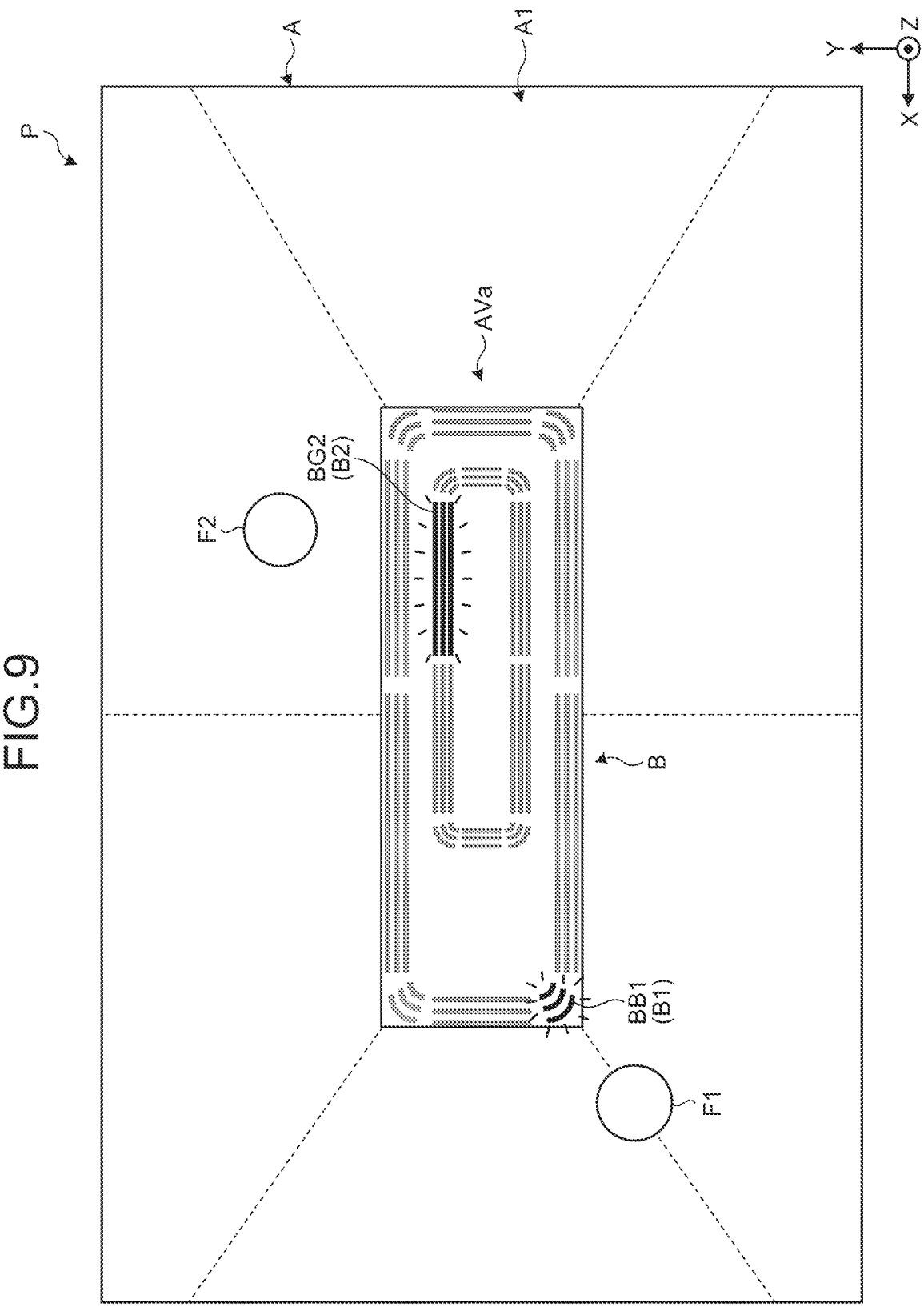
FIG. 9 is a diagram illustrating another example of a display image of the first embodiment.

Note that the display image P may have a form different from that of the first embodiment described above. FIGS. 7 to 9 are diagrams illustrating other examples of a display image of the first embodiment. In the first embodiment, the approach state image B has been displayed in both of a case where there is no obstacle and a case where there is an obstacle. However, as illustrated in FIG. 7, an approach state image B may not be displayed in a case where there is no obstacle, and may be displayed in a case where there is an obstacle. Also in this case, it can be said that a display content of the approach state image B differs in a case where there is no obstacle and in a case where there is an obstacle. In addition, the approach state image B may display only a range that cannot be visually confirmed by the driver, such as a direct view, a side mirror or the like. In this case, it is desirable to hold the range that cannot be visually confirmed, in the storage unit 24 in advance.

In addition, the own vehicle image AV was the development view of the vehicle V in the first embodiment, but is not limited to the development view as long as it includes the information on the position of the vehicle V in each vertical direction as described above. For example, as illustrated in FIG. 8, an own vehicle image AVa may have a lower side own vehicle image AVa1 showing a place of a lower side of the vehicle V in the vertical direction, and upper side own vehicle images AVa2 and AVa3 showing places of an upper side of the vehicle V in the vertical direction as compared with the lower side own vehicle image AVa1. The lower side own vehicle image AVa1 is a frame line showing an outer periphery of a position of a lower side of the vehicle V in the vertical direction, and the upper side own vehicle images AVa2 and AVa3 are frame lines showing an outer periphery of a position of an upper side of the vehicle V in the vertical direction as compared with the lower side own vehicle image AVa1. The upper side own vehicle images AVa2 and AVa3 are displayed on an inner side (center side) of the own vehicle image AVa as compared with the lower side own vehicle image AVa1. That is, it can be said that the own vehicle image AVa is an image in which the vehicle V is displayed in a contour line shape. By displaying the lower side own vehicle image AVa1 and the upper side own vehicle images AVa2 and AVa3 as described above, it is possible to include the information on the position of the vehicle V in each vertical direction in the own vehicle image AVa, and it is thus possible to suitably recognize which position of the vehicle V in the vertical direction the obstacle is approaching. Note that in an example of FIG. 8, the upper side own vehicle image AVa2 is a frame line showing an upper side of the vehicle portion V1, and the upper side own vehicle image AVa3 is a frame line showing the container portion V2.

In addition, as illustrated in FIG. 9, an own vehicle image AVa may be displayed as one frame line. That is, the own vehicle image AVa illustrated in FIG. 9 may not include the information on the position of the vehicle V in each vertical direction. Also in this case, due to the approach state image B, it is possible to suitably recognize which position of the vehicle V in the vertical direction the obstacle is approaching.

Second Embodiment

Next, a second embodiment will be described. In a second embodiment, a display content of an obstacle image displayed on a display image P is different from that of the first embodiment. In a second embodiment, a description for parts having the same configurations as those of the first embodiment will be omitted.

Figure 10:
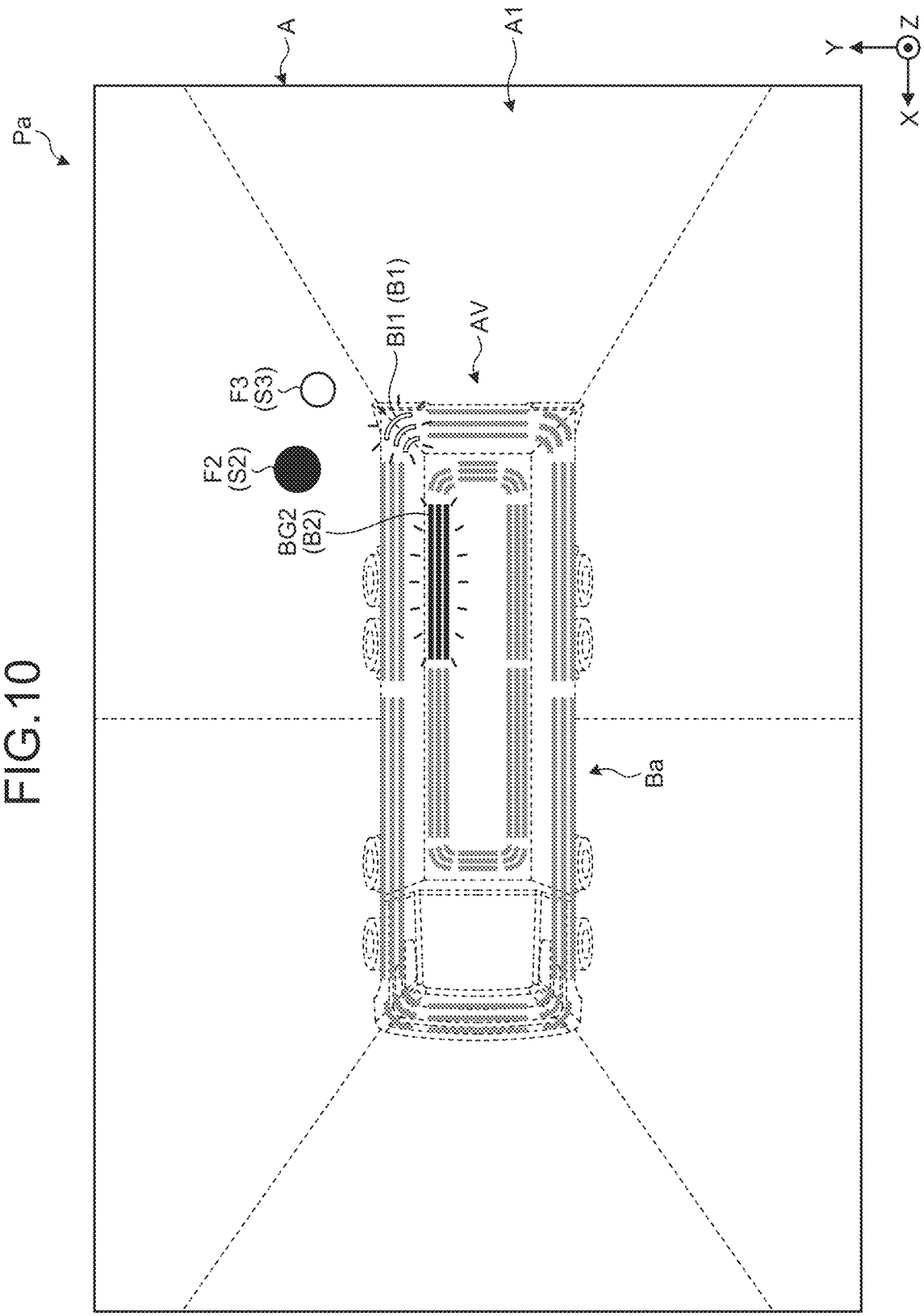
FIG. 10 is a schematic view illustrating a display image according to a second embodiment.

FIG. 10 is a schematic view illustrating a display image according to a second embodiment. FIG. 10 illustrates an example in which a display image Pa according to the second embodiment causes a surrounding overhead image A1 to display obstacle images F2 and F3. The obstacle image F2 is an image of an obstacle S2 approaching an upper side of a right rear side of a vehicle V, and the obstacle image F3 is an image of the obstacle S3 approaching a lower side of a corner of a right rear of the vehicle V. In the second embodiment, the overhead image generation unit 40 makes display contents of the obstacle images in an overhead image A different from each other depending on which position of the vehicle V the obstacle approaches. That is, the obstacle S2 and the obstacle S3 are approaching different positions of the vehicle V in the vertical direction. Therefore, the overhead image generation unit 40 makes display contents of the obstacle image F2 and the obstacle image F3 different from each other. Specifically, it is preferable that the overhead image generation unit 40 displays the obstacle image F2 and the obstacle image F3 differently in terms of points other than shapes of the obstacle image F2 and the obstacle image F3 while keeping the shapes of the obstacle image F2 and the obstacle image F3 in a state of being converted into an image viewed from the vertical direction at the time of generation of the overhead image A. For example, the overhead image generation unit 40 may display the obstacle image F2 and the obstacle image F3 in different colors. In addition, the overhead image generation unit 40 may attach different marks, characters or the like to the obstacle image F2 and the obstacle image F3. Note that positions that the obstacle S2 and the obstacle S3 approach are different from each other in the vertical direction of the vehicle V, but the overhead image generation unit 40 may make display contents of obstacle images of obstacles approaching different positions around the vehicle V (peripheral direction) different from each other, similar to the obstacle image F2 and the obstacle image F3.

More specifically, in the second embodiment, the approach state image generation unit 42 makes a display content of the approach state image B different for each position of the vehicle V in the vertical direction. Then, the overhead image generation unit 40 associates the display content of the obstacle image with a display content of the approach state image B at a place that the obstacle of an image source of the obstacle image is approaching. That is, in the example of FIG. 10, the overhead image generation unit 40 associates a position of the approach state image BI1, that is, the obstacle image F3 of the obstacle S3 approaching the lower side of the corner of the right rear with a display content of the approach state image BI1. Similarly, the overhead image generation unit 40 associates a position of the approach state image BG2, that is, the obstacle image F2 of the obstacle S2 approaching the upper side of the right rear with a display content of the approach state image BG2. The display content here is, for example, a color. That is, the overhead image generation unit 40 makes a color of the obstacle image F3 the same as a color of the approach state image BI1 and makes a color of the obstacle image F2 the same as a color of the approach state image BG2. However, the display content is not limited to the color, and may be any display such as a mark, a character or the like. In this case, for example, the overhead image generation unit 40 makes a mark or a character attached to the obstacle image F3 the same as a mark or a character attached to the approach state image BI1 and makes a mark or a character attached to the obstacle image F2 the same as a mark or a character attached to the approach state image BG2. Note that the approach state image generation unit 42 has made the display content of the approach state image B different for each position of the vehicle V in the vertical direction in the example of FIG. 10, but approach state image generation unit 42 may make the display content of the approach state image B different for each position around the vehicle V.

Figure 11:
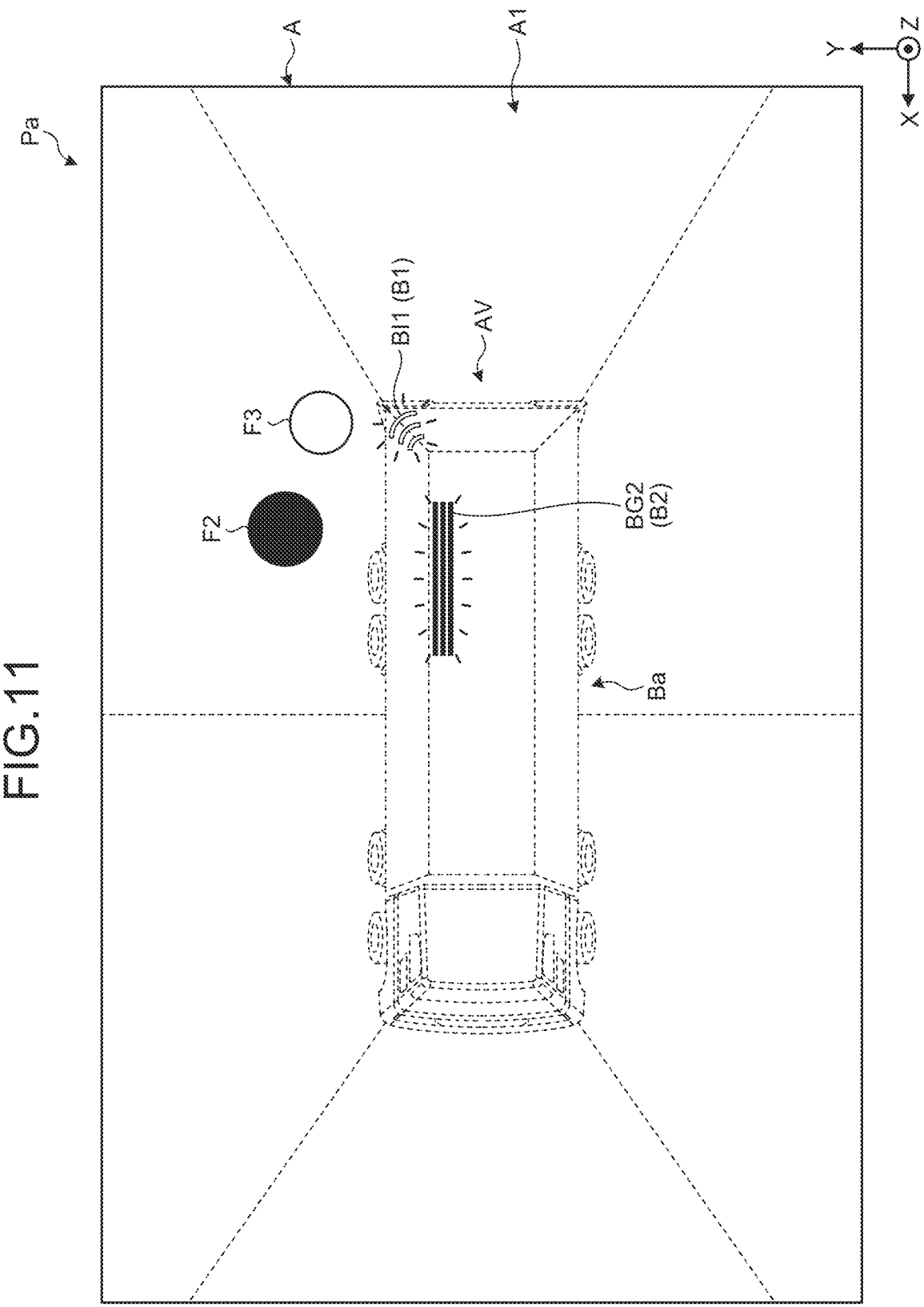
FIG. 11 is a schematic view illustrating another example of a display image according to the second embodiment.

Note that it is preferable that the approach state image generation unit 42 makes a display content other than the color different in a case where the color of the approach state image B is made different for each position, for example, in a case where the obstacle is approaching the vehicle and in a case where the obstacle is not approaching the vehicle. For example, the approach state image generation unit 42 may blink the approach state image B in a case where the obstacle is approaching the vehicle while keeping the same color displayed in a case where the obstacle is not approaching the vehicle. FIG. 11 is a schematic view illustrating another example of a display image according to the second embodiment. As illustrated in FIG. 11, the approach state image generation unit 42 may display the approach state image B only in a case where an obstacle is approaching the vehicle.

As such, in the second embodiment, the approach state image generation unit 42 makes the display content of the approach state image B different for each position of the vehicle V. The position of the vehicle V here refers to at least one of the position of the vehicle V in the vertical direction and the position around the vehicle V. Then, the overhead image generation unit 40 associates a display content of an image (obstacle image) showing the obstacle with a display content of the approach state image B at a position that the obstacle is approaching. Therefore, according to the second embodiment, it is possible to more suitably recognize which position which obstacle is approaching.

In addition, the approach state image generation unit 42 makes the color of the approach state image B different for each position of the vehicle V, and the overhead image generation unit 40 makes the color of the obstacle image the same as the color of the approach state image B at the position where the obstacle is approaching. Therefore, according to the second embodiment, by making the colors the same as each other, it is possible to more suitably recognize which position which obstacle is approaching.

The present embodiments have been described hereinabove, but the embodiments are not limited by contents of these embodiments. In addition, the components described above include those that can be easily assumed by those skilled in the art, those that are substantially the same, and those that are in a so-called equivalent range. Further, the components described above can be appropriately combined with each other. Further, various omissions, substitutions, or changes of the components can be made without departing from the scope of the embodiments described above.

INDUSTRIAL APPLICABILITY

An overhead image generation device, an overhead image generation method, and a program according to the present embodiment can be used in, for example, a display device.

According to the present embodiment, it is possible to cause a driver to appropriately recognize which position of a vehicle an obstacle is approaching.

What is claimed is:
1. An overhead image generation device comprising:
   an image acquisition unit that acquires a peripheral image by capturing an image of a periphery of a vehicle;
   an approach information acquisition unit that acquires approach information indicating an approach state of an obstacle detected in the periphery of the vehicle to the vehicle;

an overhead image generation unit that generates an overhead image from the peripheral image by performing viewpoint conversion processing causing the overhead image to render a perspective that looks down on the vehicle from above;

an approach state image generation unit that generates, based on the approach information, an approach state image showing an approach state of the obstacle to the vehicle for respective positions around the vehicle and on an upper portion and a lower portion of the vehicle; and a display control unit that superimposes the overhead image and the approach state image to yield a superimposed image, wherein the overhead image includes a surrounding overhead image and a vehicle image displayed inside the surrounding overhead image, the vehicle image is a development view of the vehicle that displays images of side surfaces of the vehicle that surround an image of an upper surface of the vehicle, and the display control unit superimposes the approach state image on different positions of the respective positions in the vehicle image based on a position from which the obstacle approaches the vehicle and a determination of whether the obstacle approaches the upper portion or the lower portion of the vehicle.

2. The overhead image generation device according to claim 1, wherein the overhead image generation unit generates the overhead image so that the vehicle image is located at a central portion of the overhead image, and the vehicle image includes information on a position of the vehicle in an upward direction.

3. The overhead image generation device according to claim 2, wherein the development view is centered on a surface of an upper side of the vehicle.

4. The overhead image generation device according to claim 1, wherein the approach state image generation unit generates a lower side approach state image and an upper side approach state image as the approach state image, and displays the upper side approach state image on a central portion side of the overhead image as compared with the lower side approach state image, the lower side approach state image showing an approach state of the obstacle to the lower portion of the vehicle, and the upper side approach state image showing an approach state of the obstacle to the upper portion of the vehicle.

5. The overhead image generation device according to claim 1, wherein the approach state image is displayed so as to be superimposed on a different position, of the respective positions, in the vehicle image based on a direction from which the obstacle approaches the vehicle.

6. An overhead image generation method comprising:

acquiring a peripheral image by capturing an image of a periphery of a vehicle;

acquiring approach information indicating an approach state of an obstacle detected in the periphery of the vehicle to the vehicle;

generating an overhead image from the peripheral image by performing viewpoint conversion processing that causes the overhead image to render a perspective that looks down on the vehicle from above;

generating, based on the approach information, an approach state image showing an approach state of the obstacle to the vehicle for respective positions around the vehicle and on an upper portion and a lower portion of the vehicle; and superimposing the overhead image and the approach state image to yield a superimposed image, wherein the overhead image includes a surrounding overhead image and a vehicle image displayed inside the surrounding overhead image, the vehicle image is a development view of the vehicle that displays images of side surfaces of the vehicle that surround an image of an upper surface of the vehicle, and the approach state image is superimposed on different positions of the respective positions in the vehicle image based on a position from which the obstacle approaches the vehicle and a determination of whether the obstacle approaches the upper portion or the lower portion of the vehicle.

7. The overhead image generation method according to claim 6, wherein the generating of the overhead image comprises generating the overhead image so that the vehicle image is located at a central portion of the overhead image, and the vehicle image includes information on a position of the vehicle in an upward direction.

8. The overhead image generation method according to claim 7, wherein the generating of the overhead image comprises generating the overhead image to center the development view on a surface of an upper side of the vehicle.

9. The overhead image generation method according to claim 6, wherein the generating of the approach state image comprises generating a lower side approach state image and an upper side approach state image as the approach state image, and displaying the upper side approach state image on a central portion side of the overhead image as compared with the lower side approach state image, the lower side approach state image showing an approach state of the obstacle to the lower portion of the vehicle, and the upper side approach state image showing an approach state of the obstacle to the upper portion of the vehicle.

10. The overhead image generation method according to claim 6, wherein the approach state image is displayed so as to be superimposed on a different position, of the respective positions, in the vehicle image based on a direction from which the obstacle approaches the vehicle.

11. A non-transitory computer readable recording medium storing therein a program for causing a computer to execute steps, the steps comprising:

acquiring a peripheral image by capturing an image of a periphery of a vehicle;

acquiring approach information indicating an approach state of an obstacle detected in the periphery of the vehicle to the vehicle;

generating an overhead image from the peripheral image by performing viewpoint conversion processing that causes the overhead image to render a perspective that looks down on the vehicle from above;

generating, based on the approach information, an approach state image showing an approach state of the obstacle to the vehicle for respective positions around the vehicle and on an upper portion and a lower portion of the vehicle; and superimposing the overhead image and the approach state image to yield a superimposed image, wherein the overhead image includes a surrounding overhead image and a vehicle image displayed inside the surrounding overhead image, the vehicle image is a development view of the vehicle that displays images of side surfaces of the vehicle that surround an image of an upper surface of the vehicle, and the approach state image is superimposed on different positions of the respective positions in the vehicle image based on a position from which the obstacle approaches the vehicle and a determination of whether the obstacle approaches the upper portion or the lower portion of the vehicle.

12. The non-transitory computer readable recording medium according to claim 11, wherein the generating of the overhead image comprises generating the overhead image so that the vehicle image is located at a central portion of the overhead image, and the vehicle image includes information on a position of the vehicle in an upward direction.

13. The non-transitory computer readable recording medium according to claim 12, wherein the generating of the overhead image comprises generating the overhead image to center the development view on a surface of an upper side of the vehicle.

14. The non-transitory computer readable recording medium according to claim 11, wherein the generating of the approach state image comprises generating a lower side approach state image and an upper side approach state image as the approach state image, and displaying the upper side approach state image on a central portion side of the overhead image as compared with the lower side approach state image, the lower side approach state image showing an approach state of the obstacle to the lower portion of the vehicle, and the upper side approach state image showing an approach state of the obstacle to the upper portion of the vehicle.

15. The non-transitory computer readable recording medium according to claim 11, wherein the approach state image is displayed so as to be superimposed on a different position, of the respective positions, in the vehicle image based on a direction from which the obstacle approaches the vehicle.

\* \* \* \* \*